United States Patent
Saito et al.

(10) Patent No.: US 7,663,713 B2
(45) Date of Patent: Feb. 16, 2010

(54) LIGHT GUIDE PLATE FOR A DISPLAY PANEL HAVING ARCUATE GROOVES FORMED IN THE INCIDENT AND UPPER SURFACES

(75) Inventors: Ken Saito, Mobara (JP); Shigeo Shimano, Chosei (JP); Hiroshi Nakamoto, Chiba (JP); Hiroyuki Yoshida, Mobara (JP); Hirokazu Yabe, Mobara (JP); Toshitsugu Miyawaki, Chonan (JP); Akiyoshi Tobe, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 322 days.

(21) Appl. No.: 11/287,294

(22) Filed: Nov. 28, 2005

(65) Prior Publication Data
US 2006/0114372 A1 Jun. 1, 2006

(30) Foreign Application Priority Data
Nov. 29, 2004 (JP) .............................. 2004-344695

(51) Int. Cl.
G02F 1/335 (2006.01)
F21V 7/04 (2006.01)
G02B 6/10 (2006.01)

(52) U.S. Cl. ........................... 349/65; 349/62; 362/615; 362/617; 385/146; 385/901

(58) Field of Classification Search ............ 349/61–71; 362/600–634, 551, 559, 561; 395/146, 901
See application file for complete search history.

(56) References Cited

U.S. PATENT DOCUMENTS

| 7,101,070 | B2 * | 9/2006 | Yu et al. ..................... 362/558 |
| 2004/0114068 | A1 * | 6/2004 | Yu et al. ........................ 349/65 |
| 2004/0120139 | A1 * | 6/2004 | Kunimochi et al. .......... 362/31 |
| 2004/0246698 | A1 * | 12/2004 | Shimizu et al. ............... 362/31 |

FOREIGN PATENT DOCUMENTS

JP 09113907 A * 5/1997

* cited by examiner

*Primary Examiner*—David Nelms
*Assistant Examiner*—Jessica M Merlin
(74) *Attorney, Agent, or Firm*—Antonelli, Terry, Stout & Kraus, LLP.

(57) ABSTRACT

A liquid crystal display device includes a liquid crystal panel and an illumination device. The illumination device has a light guide plate and at least one spot light source on at least one side surface of the light guide plate. The light guide plate includes a large number of upper-surface arcuate cross-sectional grooves in a direction orthogonal to the one side surface on a surface thereof which faces the liquid crystal panel, and a large number of light-incident-surface arcuate cross-sectional grooves are formed in a thickness direction of the light guide plate on at least a portion of the one side surface which faces a position at which the spot light source is arranged. A relationship is provided between a contact angle Oa of the upper-surface arcuate cross-sectional grooves and a contact angle Ea of the light-incident-surface arcuate cross-sectional grooves.

16 Claims, 15 Drawing Sheets

LIGHT GUIDE PLATE FOR A DISPLAY PANEL HAVING ARCUATE GROOVES FORMED IN THE INCIDENT AND UPPER SURFACES

CROSS-REFERENCE TO RELATED APPLICATIONS

The disclosure of Japanese Patent Application No. 2004-344695 filed on Nov. 29, 2004 including the specification, drawings and abstract is incorporated herein by reference in its entirety.

BACKGROUND OF THE INVENTION

1. Field of the Invention

The present invention relates to a liquid crystal display device, and is suitable for a liquid crystal display device which includes aback illumination device (a backlight) which arranges solid light emitting elements such as light emitting diode elements as an illumination light source of a liquid crystal display panel on a side surface of a light guide plate.

2. Description of the Related Art

In a miniaturized information terminal such as a mobile telephone or a portable information terminal, as a display device thereof, a liquid crystal display device which is electric power saving, small-sized and light-weighted has been popularly used. With respect to the liquid crystal display device, there have been known a liquid crystal display device which uses an external light as an illumination means for visualizing an electronic latent image which is formed on a liquid crystal display panel or a liquid crystal display device which installs an auxiliary illumination device (hereinafter simply referred to as an illumination device) on a back surface or a front surface of the liquid crystal display panel. The illumination device which is mounted on the back surface of the liquid crystal display panel is usually referred to as the backlight, while the illumination device which is mounted on the front surface is generally referred to as a front light.

As the backlight of the miniaturized information terminal such as the mobile phone or the like, there exists a backlight which includes a light guide plate which arranges a cold cathode fluorescent lamp on a sidewall (a side edge, an incident surface) as in the case of a notebook personal computer having a relatively large sized display screen. However, it is preferable to use a backlight which includes one or a plurality of solid light emitting elements which are represented by light emitting diode elements which exhibit the small power consumption in place of the cold cathode fluorescent lamp.

With respect to a backlight of a type in which a plurality of light emitting diode elements are used as a light source, light which light emitting diode elements emit is incident on a side surface (incident surface) of a light guide plate, and the light is irradiated from an upper surface of the light guide plate as a surface light source, there exists the large brightness difference between a portion in front of the light emitting diode elements and a portion between the light emitting diode elements in the inside of the light guide plate. Particularly, this tendency is apparent in the backlight which arranges a prism sheet having downward prism grooves on an upper surface of the light guide plate (between the light emitting diode element and the liquid crystal display panel). Although various proposals have been made to decrease the brightness difference among the light emitting diode elements when a plurality of light emitting diode elements are used, these proposals are less than optimal.

As a backlight of this type, trials for overcoming the brightness irregularities by focusing on a shape of grooves formed in a light guide plate have been proposed in a U.S. Patent Pub. No. 2004/0120139A1 (patent literature 1), U.S. Pat. No. 6,921,178B2 (patent literature 2), and Japanese Patent Laid-open No. 227956/2004 (patent literature 3).

BRIEF SUMMARY OF THE INVENTION

Although the inventions disclosed in the above-mentioned respective patent literatures are provided for coping with the brightness irregularities of the irradiation light from the light guide plate on which the light from the light emitting diode elements which constitute the light source is incident by focusing on the shape of grooves formed on the light guide plate, these patent literatures merely disclose the general groove shape and the relationship of mutual grooves is not taken into consideration at all.

Accordingly, it is an object of the present invention to provide a liquid crystal display device which can realize the uniform brightness on an irradiation surface of a backlight which is constituted by arranging light emitting diode elements on an incident surface of the light guide plate.

The present invention has been made based on a finding which is obtained in a course of reviewing the countermeasures by making use of grooves or projections of various shapes formed on the light guide plate, that is, the finding that an upper surface or a lower surface of the light guide plate and grooves formed on a side surface on which a light source is arranged have a mutual relationship with respect to the brightness on the upper surface of the light guide plate, particularly, the present invention is made on an irradiation surface (an upper surface of a case shown in FIG. 1) of the light guide plate and the shape of grooves formed on an incident surface.

To describe typical constitutions of the present invention, they are as follows. That is:

According to a first aspect of the present invention, the liquid crystal display device of the present invention is a liquid crystal display device which includes a liquid crystal panel and an illumination device which is arranged on a back surface of a liquid crystal panel, wherein the illumination device includes a light guide plate and at least one spot light source on at least one side surface of the light guide plate, the light guide plate includes a large number of upper-surface arcuate cross-sectional grooves in the direction orthogonal to one side surface on a surface thereof which faces the liquid crystal panel, a large number of light-incident-surface arcuate cross-sectional grooves are formed in the thickness direction of the light guide plate on at least a portion of one side surface which faces a position at which the spot light source is arranged, and a relationship between a contact angle Oa of the upper-surface arcuate cross-sectional grooves and a contact angle Ea of the light-incident-surface arcuate cross-sectional grooves is set as $$1.5 \times Oa - 35(°) \leq Ea(°) \leq 1.5 \times Oa - 27(°)$$

By setting the upper-surface arcuate cross-sectional grooves and the light-incident-surface arcuate cross-sectional grooves in such a range, it is possible to provide the liquid crystal display device which exhibits the excellent brightness distribution of the light guide plate and exhibits no brightness irregularities in the vicinity of the light incident surface.

According to a second aspect of the present invention, the liquid crystal display device of the present invention is a liquid crystal display device which includes a liquid crystal panel and an illumination device which is arranged on a back surface of a liquid crystal panel, wherein the illumination device includes a light guide plate and at least one spot light source on at least one side surface of the light guide plate, the light guide plate includes a large number of upper-surface arcuate cross-sectional grooves in the direction orthogonal to one side surface on a surface thereof which faces the liquid crystal panel, a large number of incident-surface arcuate cross-sectional grooves are formed in the thickness direction of the light guide plate on at least a portion of one side surface which faces a position at which the spot light source is arranged, and a relationship between a contact angle Oa of the upper-surface arcuate cross-sectional grooves and a contact angle Ea of the light-incident-surface arcuate cross-sectional grooves is set as $$1.5 \times Oa - 39(°) \leq Ea(°) \leq 1.5 \times Oa - 23(°)$$

Due to such a constitution, it is also possible to provide the liquid crystal display device which exhibits the excellent brightness distribution of the light guide plate and exhibits no brightness irregularities in the vicinity of the light incident surface.

According to a third aspect of the present invention, the liquid crystal display device of the present invention is a liquid crystal display device which includes a liquid crystal panel and an illumination device which is arranged on a back surface of a liquid crystal panel, wherein the illumination device includes a light guide plate and at least one spot light source on at least one side surface of the light guide plate, the light guide plate includes a large number of upper-surface arcuate cross-sectional grooves in the direction orthogonal to one side surface on a surface thereof which faces the liquid crystal panel, a large number of light-incident-surface arcuate cross-sectional grooves are formed in the thickness direction of the light guide plate on at least a portion of one side surface which faces a position at which the spot light source is arranged, and when a distance which is ½ between the spot light source and a spot light source is smaller than a distance between the spot light source arranged at an outermost side and a corner portion of the light guide plate, on an upper surface of the light guide plate, a flat portion is formed in the vicinity of a region which extends from the spot light source arranged at the outermost side to the corner portion.

Further, also in the constitution of the third embodiment, it is possible to set a relationship between a contact angle Oa of the upper-surface arcuate cross-sectional grooves and a contact angle Ea of the light-incident-surface arcuate cross-sectional grooves as follows.

$$1.5 \times Oa - 35(°) \leq Ea(°) \leq 1.5 \times Oa - 27(°)$$

$$1.5 \times Oa - 39(°) \leq Ea(°) \leq 1.5 \times Oa - 23(°)$$

According to a fourth aspect of the present invention, the liquid crystal display device of the present invention is a liquid crystal display device which includes a liquid crystal panel and an illumination device which is arranged on a back surface of a liquid crystal panel, wherein the illumination device includes a light guide plate and at least one spot light source on at least one side surface of the light guide plate, the light guide plate includes a large number of lower-surface arcuate cross-sectional grooves in the direction orthogonal to one side surface on a surface thereof opposite to a surface thereof which faces the liquid crystal panel, a large number of light-incident-surface arcuate cross-sectional grooves are formed in the thickness direction of the light guide plate on at least a portion of one side surface which faces a portion at which the spot light source is arranged, and a relationship between a contact angle Oa of the lower-surface arcuate cross-sectional grooves and a contact angle Ea of the light-incident-surface arcuate cross-sectional grooves is set as $$1.5 \times Oa - 50.5(°) \leq Ea(°) \leq 1.5 \times Oa - 42.5(°)$$

By setting the lower-surface arcuate cross-sectional grooves and the light-incident-surface arcuate cross-sectional grooves in such a range, it is possible to provide the liquid crystal display device which exhibits the excellent brightness distribution of the light guide plate and exhibits no brightness irregularities in the vicinity of the light incident surface.

According to a fifth aspect of the present invention, the liquid crystal display device of the present invention is a liquid crystal display device which includes a liquid crystal panel and an illumination device which is arranged on a back surface of a liquid crystal panel, wherein the illumination device includes a light guide plate and at least one spot light source on at least one side surface of the light guide plate, the light guide plate includes a large number of lower-surface arcuate cross-sectional grooves in the direction orthogonal to one side surface on a surface thereof opposite to a surface which faces the liquid crystal panel, a large number of light-incident-surface arcuate cross-sectional grooves are formed in the thickness direction of the light guide plate on at least a portion of one side surface which faces a position at which the spot light source is arranged, and a relationship between a contact angle Oa of the lower-surface arcuate cross-sectional grooves and a contact angle Ea of the light-incident-surface arcuate cross-sectional grooves is set as $$1.5 \times Oa - 54.5(°) \leq Ea(°) \leq 1.5 \times Oa - 38.5(°)$$

Due to such a constitution, it is also possible to provide the liquid crystal display device which exhibits the excellent brightness distribution of the light guide plate and exhibits no brightness irregularities in the vicinity of the light incident surface.

According to a sixth aspect of the present invention, the liquid crystal display device of the present invention is a liquid crystal display device which includes a liquid crystal panel and an illumination device which is arranged on a back surface of a liquid crystal panel, wherein the illumination device includes a light guide plate and at least one spot light source on at least one side surface of the light guide plate, the light guide plate includes a large number of lower-surface arcuate cross-sectional grooves in the direction orthogonal to one side surface on a surface thereof opposite to a surface thereof which faces the liquid crystal panel, a large number of light-incident-surface arcuate cross-sectional grooves are formed in the thickness direction of the light guide plate on at least a portion of one side surface which faces a position at which the spot light source is arranged, and when a distance which is ½ between the spot light source and a spot light source is smaller than a distance between the spot light source arranged at an outermost side and a corner portion of the light guide plate, on a lower surface of the light guide plate, a flat portion is formed in the vicinity of a region which extends from the spot light source arranged at the outermost side to the corner portion.

Further, also in the constitution of the sixth embodiment, it is possible to set a relationship between a contact angle Oa of the upper-surface arcuate cross-sectional grooves and a contact angle Ea of the light-incident-surface arcuate cross-sectional grooves as follows.

$$1.5 \times Oa - 50.5(°) \leq Ea(°) \leq 1.5 \times Oa - 42.5(°)$$

$$1.5 \times Oa - 54.5(°) \leq Ea(°) \leq 1.5 \times Oa - 38.5(°)$$

As described above, in the backlight which uses the light guide plate which interposes downward prisms on the back surface of the liquid crystal display panel, by adjusting the arcuate cross-sectional shape of the upper surface (or the lower surface) of the light guide plate, the arcuate cross-sectional shape of grooves of the light incident surface and the height of grooves of the triangular cross-sectional shape of the lower surface (or the upper surface) of the light guide plate, it is possible to acquire balance between the luminance in front of the LED and the luminance between the LEDs in the inside of the light incident surface of the light guide plate thus reducing the brightness irregularities which are generated in the vicinity of the light incident portion. This is because three surfaces function as follows.

That is, the larger the contact angle of the arcuate cross-sectional shape portion (light-incident-surface arcuate cross-sectional grooves) of the upper surface (lower surface) of the light guide plate orthogonal to the light incident surface (the larger a rising angle of the arcuate cross-sectional shape with respect to the light incident surface or the larger the height of the arcuate cross-sectional shape portion), the brightness in front of the LED is increased and the brightness between the LEDs is reduced.

Further, the brightness in front of the LEDs is decreased corresponding to the increase of the contact angle of the arcuate cross-sectional shape of the input-surface-arcuate cross-sectional grooves formed in the light incident surface or corresponding to the increase of the height of the grooves. To the contrary, the brightness between the LEDs is increased corresponding to the increase of the contact angle of the arcuate cross-sectional shape of the input-surface-arcuate cross-sectional grooves formed in the light incident surface or corresponding to the increase of the height of the grooves.

Further, the brightness in front of the LED is increased corresponding to the increase of the height of the lower-surface triangular cross-sectional grooves parallel to the light incident surface on the lower surface (or the upper surface) of the light guide plate.

When the liquid crystal display device adopting the back light which uses the downward prisms and the light guide plate on the back surface of the liquid crystal display panel is manufactured, it is confirmed that compared to a conventional back light which uses a diffusion sheet and two upward prisms arranged orthogonal to each other, the brightness in the front surface direction is increased 1.4 times or more.

Further, to achieve the reduction of a part cost and the reduction of a product cost attributed to the reduction of assembling man-hours, the non-use of a diffusion sheet may be considered. However, with respect to the conventional structure which uses two upward prisms, the brightness irregularities are generated in the vicinity of the light incident surface of the light guide plate thus giving rise to the drawback that the display quality is lowered. To the contrary, according to the constitution of the present invention, the brightness irregularity in the vicinity of the light incident surface of the light guide plate can be reduced whereby it is possible to obtain the liquid crystal display device which exhibits the high display quality at a low cost.

It is needless say that the present invention is not limited to the above-mentioned constitutions and constitutions which are explained in embodiments described later, and various modifications can be made without departing from a technical concept of the present invention.

According to the constitutions of the present invention, the brightness irregularities in the vicinity of the light incident surface of the light guide plate can be reduced whereby it is possible to acquire the liquid crystal display device which exhibits the high display quality.

BRIEF DESCRIPTION OF THE DRAWINGS

FIG. 7A and FIG. 7B are cross-sectional views, wherein FIG. 7A is the cross-sectional view of the upper-surface arcuate cross-sectional grooves taken along a plane B in FIG. 6 and FIG. 7B is the cross-sectional view of the light incident-surface arcuate cross-sectional groove taken along a plane C in FIG. 6;

DETAILED DESCRIPTION OF THE INVENTION

Hereinafter, embodiments of the present invention are explained in detail in conjunction with drawings which show the embodiments.

EMBODIMENT 1

Figure 1:
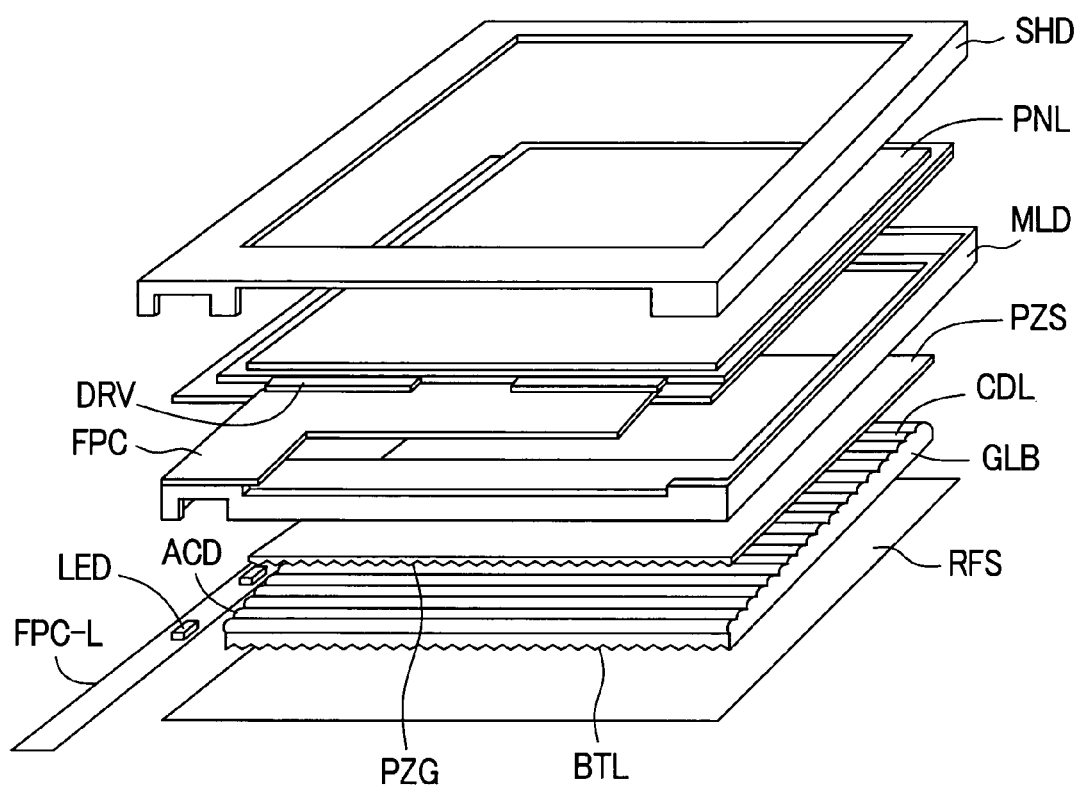
FIG. 1 is a developed perspective view showing the whole constitution of a liquid crystal display device according to the present invention.

FIG. 1 is a developed perspective view showing the whole constitution of a liquid crystal display device according to the present invention. In FIG. 1, a liquid crystal display panel PNL is configured such that a liquid crystal layer is sandwiched by two glass substrates which form image forming elements such as electrodes for selecting pixels, color filters and the like on either one of or both main surfaces (inner surfaces). A drive circuit chip (IC chip) DRV is arranged on one substrate out of these two glass substrates and controls the driving for performing a display on the liquid crystal display panel PNL.

The liquid crystal display panel PNL is usually sandwiched by an upper frame SHD formed of a metal frame and a resin-formed mold MLD from above and below. On a lower side (back surface) of the mold MLD, a backlight which is constituted of a prism sheet PZS, a light guide plate GLB, at least one (here, four) light emitting diode elements LED which are arranged on a side surface of the light guide plate GLB and constitute a light source, a reflection sheet RFS which is mounted on a lower side of the light guide plate GLD is arranged. Here, in place of the reflection sheet, a reflection film made of silver or the like may be directly arranged on the lower side of the light guide plate GLB by vapor deposition or the like.

Here, to the drive circuit chip DRV, display data, timing signals, a power source and the like are supplied from an external circuit (information processing unit) not shown in the drawing through a flexible printed circuit FPC. Further, the light emitting diode elements LED are mounted on a light-source flexible printed circuit FPC-L and are arranged in the vicinity of or close to a light incident surface of the light guide plate GLB.

The prism sheet PZS is a downward prism sheet which has prism grooves PZG on a lower surface thereof. A large number of upper-surface arcuate cross-sectional grooves CDL are formed on an upper surface of the light guide plate GLB, while a large number of lower-surface triangular cross-sectional grooves BTL which extend in the direction orthogonal to the upper-surface arcuate cross-sectional grooves CDL are formed on a lower surface of the light guide plate GLB. Further, on the light incident surface of the light guide plate GLB, light incident-surface arcuate cross-sectional grooves ACD are formed, and these light-incident-surface arcuate cross-sectional grooves ACD face the light emitting diode elements LED in an opposed manner.

FIG. 2 is a perspective view which schematically shows two examples of the constitution around the back light which constitutes the liquid crystal display device shown in FIG. 1. In FIG. 2, only the light guide plate GLB, the prism sheet (downward prism sheet) PZS which is arranged on a liquid-crystal-display-panel-PNL side of the light guide plate GLB and has apex angles of prisms (prism grooves PZG) directed to the light-guide-plate-GLB side, at least one light emitting diode element LED which is arranged on at least one side surface (light incident surface) of the light guide plate GLB, and the reflection sheet RFS which is arranged on a lower side (side opposite to the side on which the liquid crystal display panel PNL is arranged) of the light guide plate GLB are shown. Further, the direction of prism grooves PZG of the prism sheet PZS is arranged in the direction parallel to the light incident surface on which the light emitting diode elements LED are mounted. Hereinafter, the explanation is made by defining the prism sheet PZS side as viewed from the light guide plate GLB as the upper surface and the reflection sheet RFS side as the lower surface.

Figure 2A:
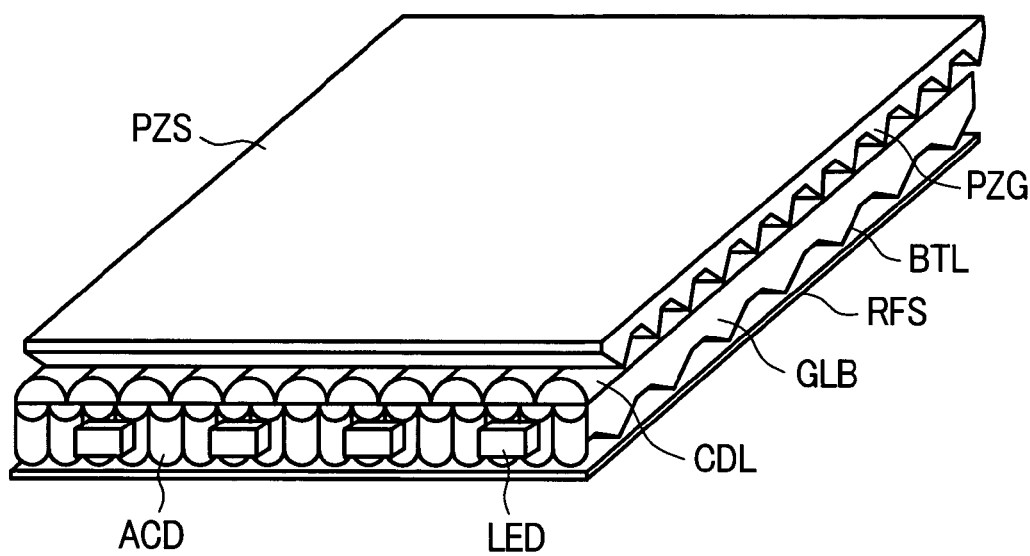
FIG. 2 is a perspective view for schematically showing two examples of the constitution around a backlight which constitutes the liquid crystal display device shown in FIG. 1.
Figure 2B:
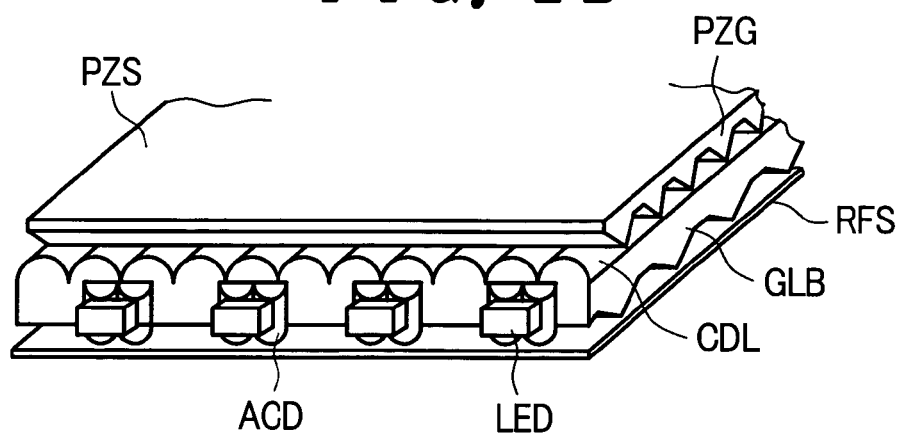

In the constitution shown in FIG. 2A, the large number of light-incident-surface arcuate cross-sectional grooves ACD which have a long axis in the thickness direction of the light guide plate GLB are formed over the whole surface of the light incident surface of the light guide plate GLB. By forming the light-incident-surface arcuate cross-sectional grooves ACD on at least a region where the light emitting diode elements LED are arranged, it is possible to obtain advantageous effects of the present invention. Accordingly, as shown in FIG. 2B, the light-incident-surface arcuate cross-sectional grooves ACD may be formed only on the region of the light incident surface which the light emitting diode elements LED face. Here, although the number of the light-incident-surface arcuate cross-sectional grooves ACD per one light emitting diode element is not particularly limited. Further, there exists no particular limitation on sizes and arrangements of the light-incident-surface arcuate cross-sectional grooves ACD and the upper-surface arcuate cross-sectional grooves CDL.

Figure 3:
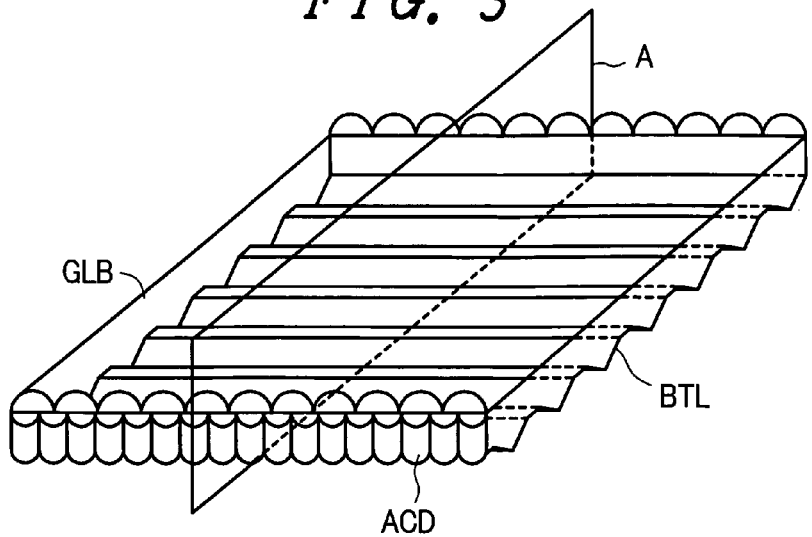
FIG. 3 is a perspective view for schematically explaining shapes applied to a lower surface and a light incident surface of a light guide plate shown in FIG. 1 and FIG. 2.
Figure 4:
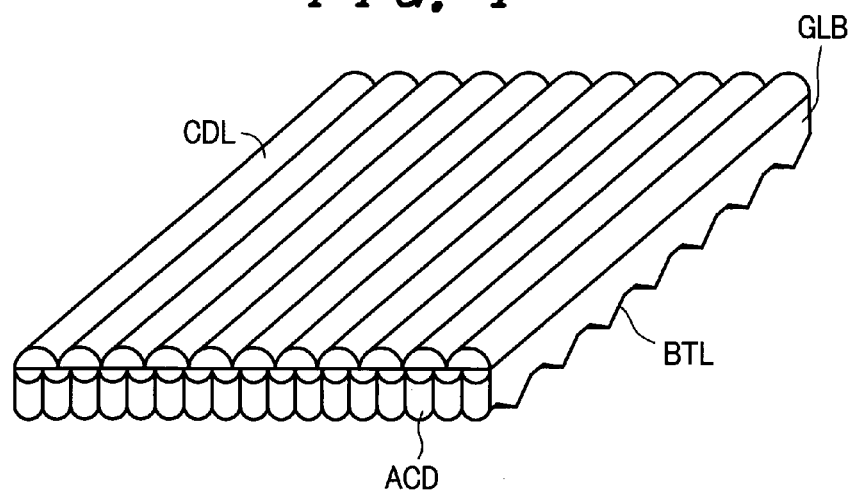
FIG. 4 is a perspective view for schematically explaining the shape applied to the upper surface of the light guide plate.

FIG. 3 is a perspective view for schematically explaining shapes which are applied to the lower surface and the light incident surface of the light guide plate shown in FIG. 1 and FIG. 2. Further, FIG. 4 is a perspective view for schematically explaining the shape applied to the upper surface of the light guide plate. Here, in FIG. 3, the upper-surface arcuate cross-sectional grooves CDL are indicated only by the arcuate cross section of an end portion. As shown in FIG. 3, on the lower surface of the light guide plate GLB, the large number of lower-surface triangular cross-sectional grooves BTL are formed in the direction parallel to the light incident surface. Further, on the upper surface of the light guide plate GLB, as shown in FIG. 4, the large number of upper-surface arcuate cross-sectional grooves CDL are formed in the direction orthogonal to the light incident surface. In the embodiment 1, the upper-surface arcuate cross-sectional grooves CDL are formed on the upper surface of the light guide plate GLB and the lower-surface triangular cross-sectional grooves BTL are formed on the lower surface of the light guide plate GLB. However, these grooves may be formed by exchanging the upper surface and the lower surface.

Figure 5:
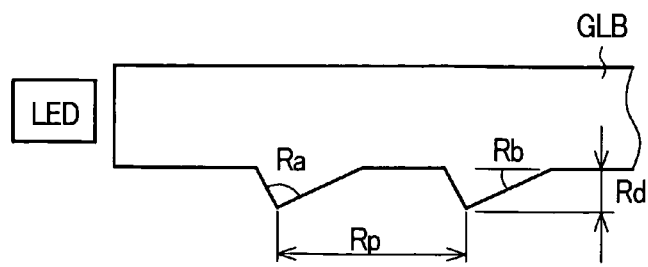
FIG. 5 is a view showing a cross section of a portion of the light guide plate as viewed taken along a plane A in FIG. 3.

FIG. 5 is a view showing a cross section of a portion of the light guide plate GLB by cutting the light guide plate GLB along a plane A in FIG. 3. As shown in FIG. 5, the lower-surface triangular cross-sectional grooves BTL which are formed on the lower surface of the light guide plate GLB are formed in parallel to the light incident surface on which the light emitting diode elements LED are arranged. By controlling an apex angle Ra or a bottom angle Rb of the lower-surface triangular cross-sectional grooves BTL, it is possible to efficiently supply the light from the light emitting diode elements LED to the liquid crystal display panel PNL side. When the prism sheet PZS having the downward prism grooves is used, by setting the bottom angle Rb to a value which falls within a range of 4 to 10 degrees, it is possible to bring the brightness peak of the light after passing the prism to a front surface of the liquid crystal display panel PNL.

Figure 6:
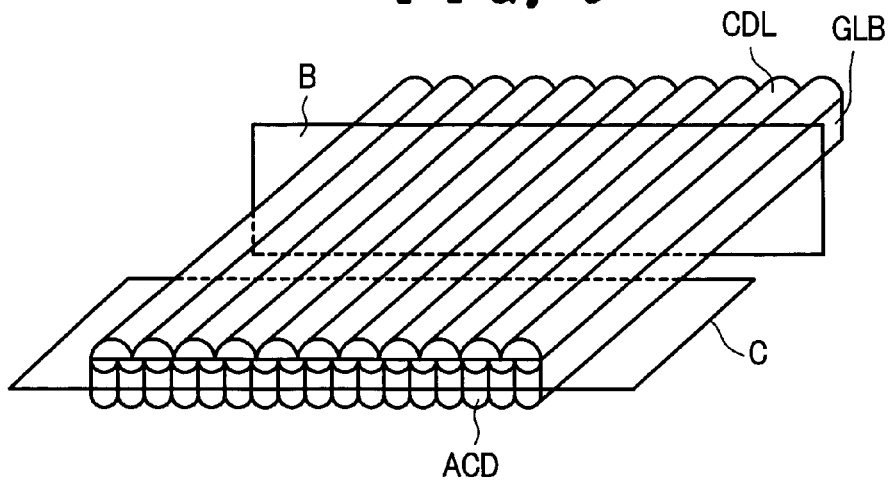
FIG. 6 is a schematic view for explaining upper-surface arcuate cross-sectional grooves and light-incident-surface arcuate cross-sectional grooves provided to the light guide plate.
Figure 7A:
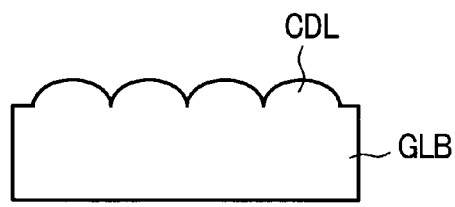
Figure 7B:
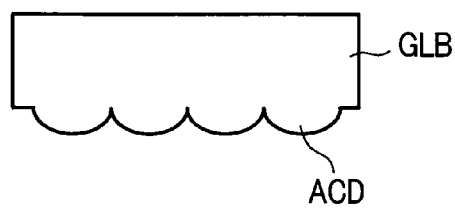

Next, the groove shapes of the upper surface and the light incident surface of the light guide plate GLB are explained in conjunction with FIG. 6, FIG. 7A and FIG. 7B. FIG. 6 is a schematic view for explaining the upper-surface arcuate cross-sectional grooves and the light-incident-surface arcuate cross-sectional grooves formed on the light guide plate GLB, FIG. 7A is a cross-sectional view of the upper-surface arcuate cross-sectional grooves CDL taken along a plane B in FIG. 6, and FIG. 7B is a cross-sectional view of the light-incident-surface arcuate cross-sectional grooves ACD taken along a plane C in FIG. 6. As shown in FIG. 7A and FIG. 7B, both of the upper-surface arcuate cross-sectional grooves CDL formed on the upper surface of the light guide plate GLB and the light-incident-surface arcuate cross-sectional grooves ACD formed on the light incident surface of the light guide plate GLB are grooves whose cross section is an arcuate shape taken along the line of a long axis of a cylinder (or an elliptical cylinder). In FIG. 7, the groove having the arcuate shape is illustrated such that the groove is formed contiguously with the neighboring groove. However, a slight flat portion may be formed between the neighboring grooves.

In the related art described in the above-mentioned patent literatures and the like, there exist descriptions with respect to the formation of such arcuate-shaped grooves in the light guide plate. However, the arcuate-shaped grooves are not specifically studied. Further, it is needless to say that the correlation between the light guide plate and the arcuate-shaped grooves has not been studied. In the embodiments of the present invention, inventers have found the correlation in the arcuate-shaped grooves formed in the light guide plate, wherein by efficiently constituting the back light having no brightness irregularities, it is possible to provide a high-quality display.

Figure 8:
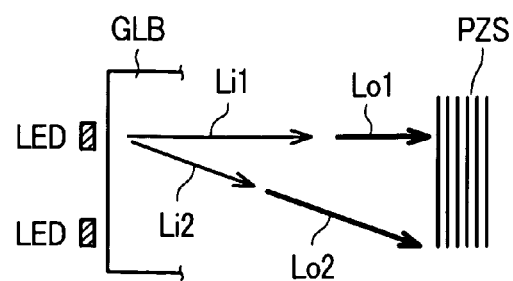
FIG. 8 is an explanatory view of a mode for irradiating light from the light guide plate GLB to the prism sheet PZS when the light guide plate includes only triangular cross-sectional grooves which are arranged in the direction parallel to a light incident surface on a lower surface thereof.
Figure 9:
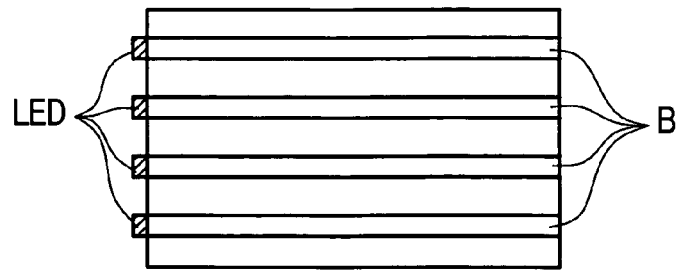
FIG. 9 is a view showing the brightness distribution on a prism sheet arranged on a light irradiation surface of the light guide plate having the constitution in FIG. 8.

Next, a case in which grooves having a triangular cross section in the direction parallel to the light incident surface are formed on the lower surface of the light guide plate is studied. FIG. 8 is an explanatory view of a mode in which the light is irradiated to the prism sheet PZS from the light guide plate GLB when only the grooves having the triangular cross section in the direction parallel to the light incident surface are formed in the lower surface of the light guide plate. Further, FIG. 9 is a view showing the brightness distribution on the downward prism sheet PZS which is arranged on the light irradiation surface of the light guide plate having the constitution shown in FIG. 8. Here, as shown in FIG. 2, four light emitting diode elements LEDs are arranged on the light incident surface of the light guide plate GLB and, at the same time, all of five surfaces of the light guide plate GLB other than the lower surface are formed into a planer surface having no grooves or the like.

In this case, the light which is incident on the light guide plate GLB from the light emitting diode elements LED is irradiated from the upper surface of the light guide plate GLB due to an action of the triangular cross-sectional grooves BTL formed on the lower surface of the light guide plate GLB.

As shown in FIG. 8, in front of the light emitting diode elements LED, the light which is incident on the light guide plate GLB from the light emitting diode elements LED is light in the direction (Lo1) orthogonal to the groove direction of the prism sheet PZS arranged above the light guide plate GLB and hence, the light which is incident on the light guide plate GLB is irradiated to the direction orthogonal to the groove direction of the downward prism sheet PZS from the upper surface of the light guide plate GLB due to an action of the triangular cross-sectional grooves BTL formed on the lower surface of the light guide plate GLB.

However, between the light emitting diode elements LED, the light is incident (Lo2) on the light guide plate GLB from the light emitting diode elements LED in the oblique direction with respect to the groove direction of the downward prism sheet PZS, and this incident light is also irradiated from the upper surface of the light guide plate GLB due to the action of the triangular cross-sectional grooves BTL formed on the lower surface of the light guide plate GLB. However, since this irradiated light is not orthogonal to the groove direction of the downward prism sheet PZS and hence, the light is not irradiated in the front surface direction of the liquid crystal display panel PNL due to the prism sheet PZS. That is, out of the irradiation light from the light guide plate GLB, only the irradiation light orthogonal to the groove direction of the prism sheet PZS is allowed to be irradiated in the front surface direction of the liquid crystal display panel PNL due to the prism sheet PZS and hence, in the case of this example, the brightness distribution of the upper surface of the prism sheet PZS becomes as shown in FIG. 9.

As shown in FIG. 9, on the prism sheet PZS above the light guide plate in the direction orthogonal to the position where four light emitting diode elements LED are arranged, the brightness B is increased, while on the prism sheet PZS above the light guide plate GLB at a position vertical to the position where the light emitting diode elements LED are not arranged, the brightness is decreased on the prism sheet PZS above the light guide plate GLB.

Although various means are considered to overcome such brightness lines B, there exists means which forms arcuate cross-sectional grooves on a surface of the light guide plate GLB which faces a surface on which triangular cross-sectional grooves are formed.

Figure 10:
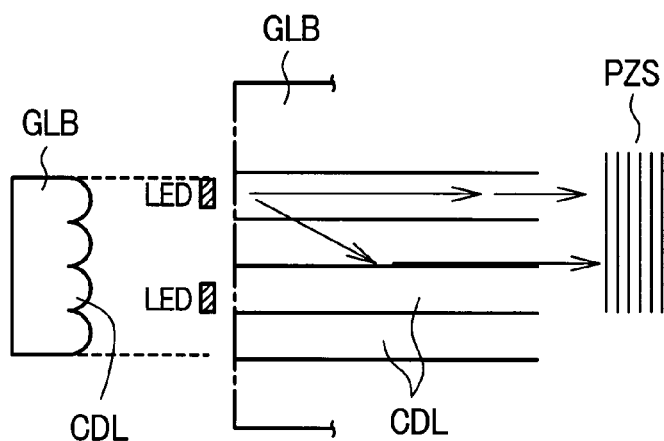
FIG. 10 is an explanatory view of a mode for irradiating light from the light guide plate GLB to the liquid crystal display panel when the lower-surface triangular cross-sectional grooves are formed on the light incident surface on the lower surface of the light guide plate and the upper-surface arcuate cross-sectional grooves are formed on an upper surface of the light guide plate.

FIG. 10 is an explanatory view of a light irradiation mode in which the light is irradiated from the light guide plate GLB to the prism sheet PZS when the upper-surface arcuate cross-sectional grooves are formed on the upper surface of the light guide plate. The groove of the upper-surface arcuate cross-sectional grooves CDL which are orthogonal to the light incident surface of the light guide plate GLB, as shown in FIG. 10, has a function of directing the incident light in the direction orthogonal to the direction of the prism grooves PZG of the prism sheet PZS when the light between the light emitting diode elements LED passes the light guide plate GLB and is irradiated from the light guide plate GLB (or is reflected in the inside of the light guide plate GLB).

Due to such a constitution, even between the light emitting diode elements LED of the light guide plate GLB, it is possible to provide the incident light having components orthogonal to the prism grooves PZG of the prism sheet PZS and hence, it is possible to allow the light having components orthogonal to the groove direction of the prism sheet PZS to be irradiated in the front surface direction of the liquid crystal display panel PNL. Accordingly, even when the spot light sources such as the light emitting diode elements LED are arranged on a side surface of the light guide plate GLB, the brightness becomes uniform in regions remote from the light incident surface and there is no possibility that the brightness lines are generated.

Figure 11:
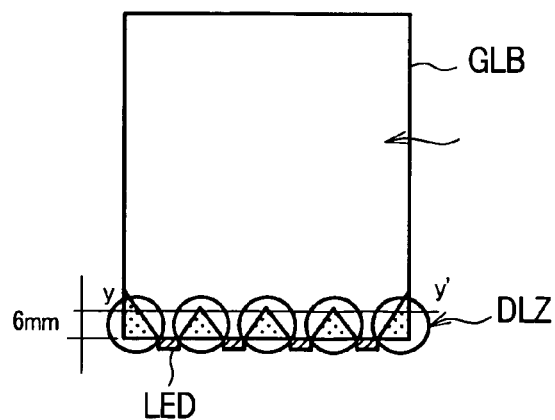
FIG. 11 is an explanatory view of the brightness on the light irradiation surface of the light guide plate when the constitution shown in FIG. 10 is adopted.

FIG. 11 is an explanatory view of the brightness on the light irradiation surface of the light guide plate GLB having the constitution shown in FIG. 10. In the constitution shown in FIG. 10, it is possible to obtain the region BHZ having the uniform brightness in a region remote from the light incident surface of the light guide plate GLB on which the light emitting diode elements LED are formed. However, at a position close to the light incident surface of the light guide plate GLB, there exists a region DKZ where the brightness is low thus lowering the display quality. FIG. 11 shows a case in which four light emitting diode elements LED are arranged at an equal interval on the light incident surface of the light guide plate GLB having a short side of 50 mm. In this case, a width of the brightness dark region DKZ which is indicated by y-y' of the light incident surface except for both ends is approximately 6 mm. To eliminate the brightness dark region DKZ, means which has an arcuate cross-sectional shape may be considered. However, the mere formation of the arcuate cross section is not sufficient to decrease the presence of the brightness dark region DKZ.

In the embodiment of the present invention, inventors of the present invention have focused on the arcuate shapes of the lower surface and the light incident surface of the light guide plate and have found that the brightness dark region can be reduced by setting the relationship of a contact angle of these arcuate shapes to a particular relationship. Here, this finding is explained in detail.

Figure 12A:
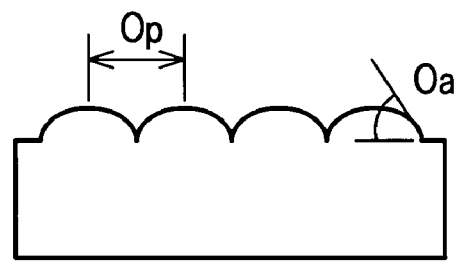
FIG. 12 is an explanatory view of the arcuate cross-sectional grooves formed on the light guide plate GLB.
Figure 12B:
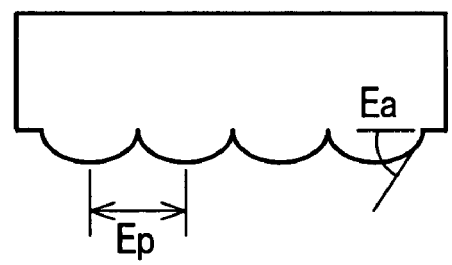

FIG. 12A and FIG. 12A are explanatory views of the arcuate cross-sectional grooves which are formed on the light guide plate GLB, wherein FIG. 12A shows a cross-sectional shape of upper-surface arcuate cross-sectional grooves CDL which are formed on an upper surface of a light guide plate similar to the light guide plate shown in FIG. 7A. FIG. 12B shows a cross-sectional shape of light-incident-surface arcuate cross-sectional grooves ACD which are formed on a light incident surface of the light guide plate similar to the light guide plate shown in FIG. 7B. In FIG. 12A, symbol Op of the upper-surface arcuate cross-sectional grooves CDL indicates a distance (pitch) between a crest and a crest of the upper-surface arcuate cross-sectional grooves CDL, while symbol Oa indicates the contact angle. In FIG. 12B, symbol Ep of the light-incident-surface arcuate cross-sectional grooves ACD indicates a distance (pitch) between a crest and a crest of the light-incident-surface arcuate cross-sectional grooves ACD, and symbol Ea indicates a contact angle. Here, the contact angle (arcuate contact angle) is described later.

Figure 13A:
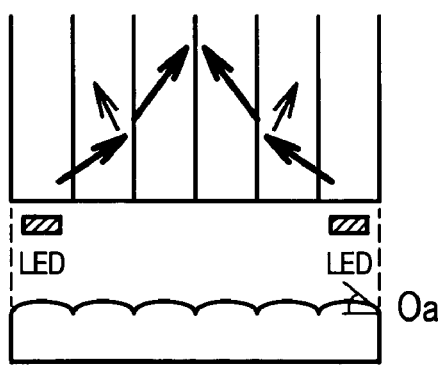
FIG. 13 is a view for explaining the relationship between a contact angle of the upper-surface arcuate cross-sectional grooves which are formed on the upper surface of the light guide plate and a quantity of light which reaches between light emitting diode elements LED.
Figure 13B:
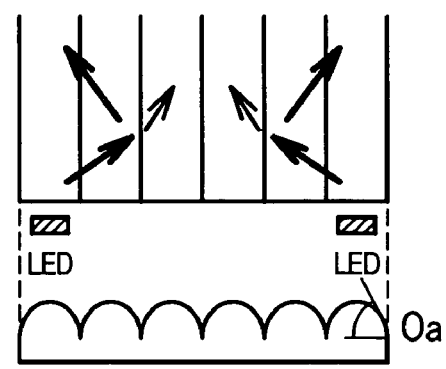

Further, FIG. 13A and FIG. 13B are views for explaining a relationship between the contact angle of the upper-surface arcuate cross-sectional grooves formed on the upper surface of the light guide plate and a quantity of light which arrives between the light emitting diode elements LED, wherein FIG. 13A shows a case in which the contact angle Oa is small and FIG. 13B shows a case in which the contact angle Oa is large.

Figure 14:
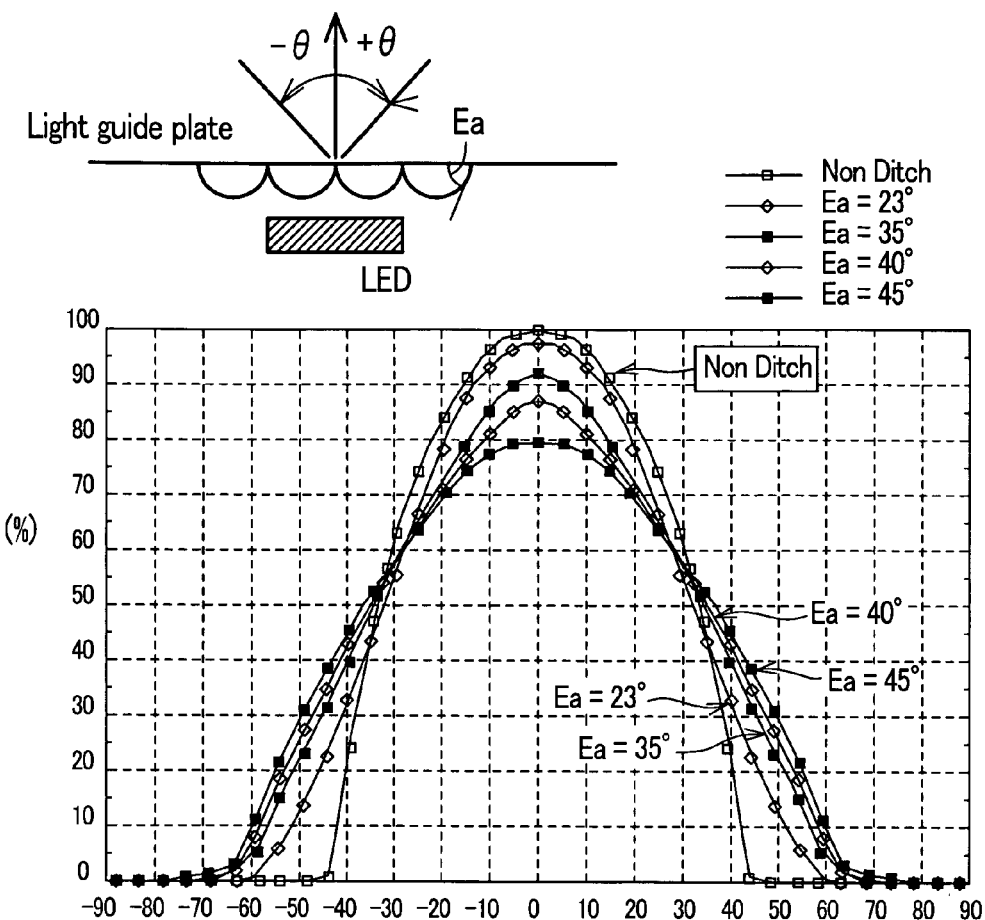
FIG. 14 is a view of a graph obtained when an optical simulation of a light angle characteristic inside the light guide plate with respect to a contact angle of the light-incident-surface arcuate cross-sectional grooves is performed.

Further, FIG. 14 is a view of a graph obtained when an optical simulation of the light angle characteristic inside the light guide plate with respect to a contact angle of the light-incident-surface arcuate cross-sectional grooves is performed. An upper-side view in FIG. 14 is an arrangement view for performing the optical simulation and a lower-side view in FIG. 14 is the light angle characteristic obtained by the optical simulation. In the optical simulation of the light angle characteristic, when the light-incident-surface arcuate cross-sectional grooves ACD are not formed, relative light intensities with respect to a spreading angle θ of the inside of the light guide plate GLB are calculated with respect to contact angles Ea of 23°, 35°, 40°, 45° are calculated.

In this embodiment, among these arcuate cross-sectional shapes, the inventors of the present invention have focused on the relationship between the contact angle Oa of the arcuate shape of the light irradiation grooves shown in FIG. 12A and the contact angle Ea of the light-incident-surface grooves shown in FIG. 13. FIG. 13A shows the case with a small contact angle Oa, wherein FIG. 13A implies that the reflection of light on the groove surface is small and hence, a quantity of light which arrives between the light emitting diode elements LED is increased. On the other hand, FIG. 13B shows that when the contact angle Oa is large, the reflection on the groove surfaces is large and hence, a quantity of light which arrives between the light emitting diode elements LED becomes small. In this manner, with respect to the contact angle Oa of the grooves of the upper-surface arcuate cross-sectional grooves CDL formed on the upper surface of the light guide plate shown in FIG. 12A, as shown in FIG. 13, corresponding to the increase of the contact angle Oa, a quantity of light which is reflected on the grooves among the light which spreads from the light emitting diode elements LED is increased and a quantity of light which arrives between the light emitting diode elements LED is decreased. Accordingly, the larger the contact angle Oa, the brightness between the light emitting diode elements LED is decreased.

Further, with respect to the contact angle Ea of the grooves of the light-incident-surface arcuate cross-sectional grooves ACD formed on the light incident surface of the light guide plate shown in FIG. 12B, as shown in FIG. 14, corresponding to the increase of the contact angle Ea, a quantity of light which spreads from the light emitting diode elements LED is increased. Accordingly, the larger the contact angle Ea, the brightness between the light emitting diode elements LED is increased. As shown in FIG. 14, a spread angle θ in the inside of the light guide plate is taken on an axis of abscissas of the graph, while the relative luminosity is taken on an axis of ordinate.

Figure 15A:
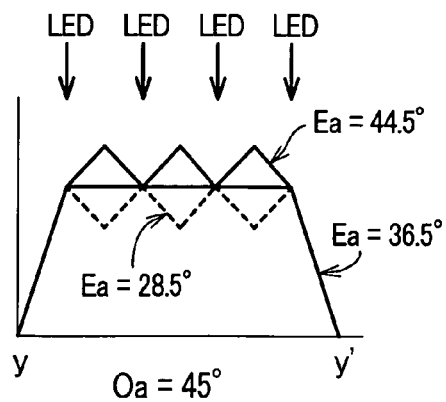
FIG. 15 is a view showing brightness curves between y-y' line of 6 mm from a light incident end shown in FIG. 11 in a graph using a contact angle Oa of the upper-surface arcuate cross-sectional grooves and a contact angel Ea of the light-incident-surface arcuate cross-sectional grooves as parameters.
Figure 15B:
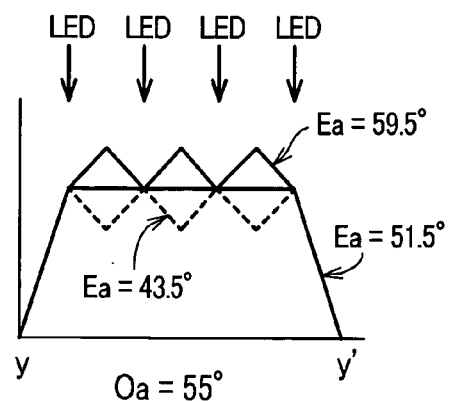

FIG. 15A and FIG. 15B are views showing brightness curves between y-y' line of 6 mm from a light incident end shown in FIG. 11 in a graph using a contact angle Oa of the upper-surface arcuate cross-sectional grooves and a contact angel Ea of the light-incident-surface arcuate cross-sectional grooves as parameters and shows a case in which upper-surface arcuate cross-sectional grooves are formed on the light guide plate. FIG. 15A and FIG. 15B show that the relationship between the brightness in front of the light emitting diode elements LED and the brightness between light emitting diode elements LED is changed due to the contact angle Oa and the contact angle Ea. In FIG. 15, the brightness is taken on an axis of ordinate.

When the arcuate contact angle Oa of the upper-surface arcuate cross-sectional grooves CDL formed on the light guide plate shown in FIG. 15A is set as Oa=45°, the brightness value in front of the light emitting diode elements LED and the brightness value between the light emitting diode elements LED become equal when the contact angle Ea of the light-incident-surface arcuate cross-sectional grooves ACD formed on the light incident surface is approximately 36.5°. When the arcuate contact angle Oa on the upper surface of the light guide plate shown in FIG. 15B is set as Oa=55°, the brightness value in front of the light emitting diode elements LED and the brightness value between the light emitting diode elements LED become equal when the contact angle Ea of the light-incident-grooves is approximately 51.5°.

Figure 16:
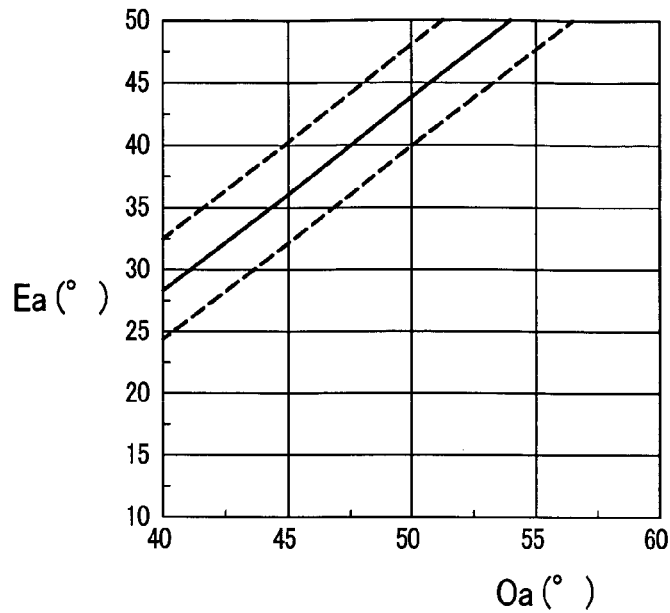
FIG. 16 is a view for explaining the relationship between the contact angle Oa and the contact angle Ea which allows the acquisition of balance between the brightness in front of the light emitting diode elements and the brightness between the light emitting diode elements when the arcuate cross-sectional grooves formed on the light guide plate are constituted of the upper-surface arcuate cross-sectional grooves.

FIG. 16 is a view for explaining the relationship between the contact angle Oa and the contact angle Ea which allows the acquisition of balance between the brightness in front of the light emitting diode elements and the brightness between the light emitting diode elements when the arcuate cross-sectional grooves formed on the light guide plate are constituted of the upper-surface arcuate cross-sectional grooves. In a graph shown in FIG. 16, the contact angle Oa(°) of the grooves formed in the lower surface of the light guide plate is taken on an axis of abscissas, and the contact angle Ea(°) of the light-incident-surface grooves of the light guide plate is taken on an axis of ordinates. Further, a solid line in the graph shows a center value of the proper contact angle Ea with respect to a certain contact angle Oa and the relationship is expressed by a following formula (1).

$$Ea(°)=-31.0+1.5 \times Oa(°) \quad \text{formula (1)}$$

Further dotted lines above and below the center value indicate a proper range of the contact angle Ea, wherein the upper dotted line is expressed by a following formula (2), while the lower dotted line is expressed by a following formula (3).

$$Ea(°)=-31.0+1.5 \times Oa+4(°) \quad \text{formula (2)}$$

$$Ea(°)=-31.0+1.5 \times Oa-4(°) \quad \text{formula (3)}$$

In this embodiment, the proper range is determined by observing a range in which the brightness balance is acquired with naked eyes.

That is:

$$-31.0+1.5 \times Oa-4(°) \leq Ea(°) \leq -31.0+1.5 \times Oa+4(°) \quad \text{formula (4)}$$

To sum up, it is confirmed that by setting the contact angle Ea within a range expressed by a following formula (5), it is possible to obtain the display device which exhibits the brightness balance.

$$1.5 \times Oa-35(°) \leq Ea(°) \leq 1.5 \times Oa-27(°) \quad \text{formula (5)}$$

Here, it is also confirmed with naked eyes that even when the contact angles Ea and Oa are set such that the contact angles Ea and Oa fall within upper and lower tolerance ranges of ±8(°) with respect to the formula (1), the brightness balance can be acquired to some extent.

In this case, the relationship between the contact angle Oa of the upper-surface arcuate cross-sectional grooves and the contact angle Ea of the light-incident-surface arcuate cross-sectional grooves is expressed by a following formula (6).

$$1.5 \times Oa-39(°) \leq Ea(°) \leq 1.5 \times Oa-23(°) \quad \text{formula (6)}$$

Figure 25A:
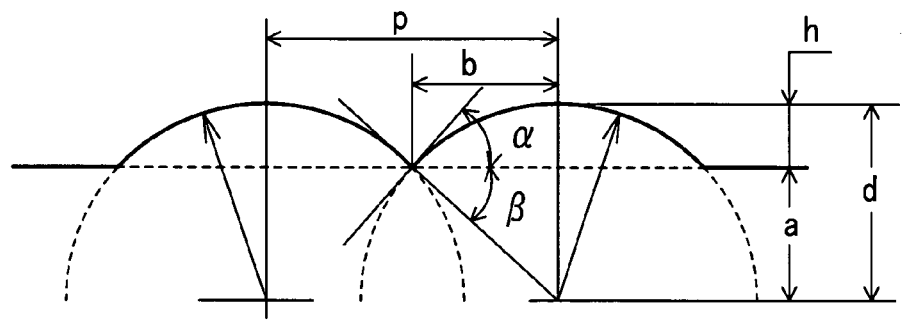
FIG. 25 is a view for explaining the definition of an arcuate contact angle of a minute arcuate across-sectional shape of a surface of the light guide plate.
Figure 25B:
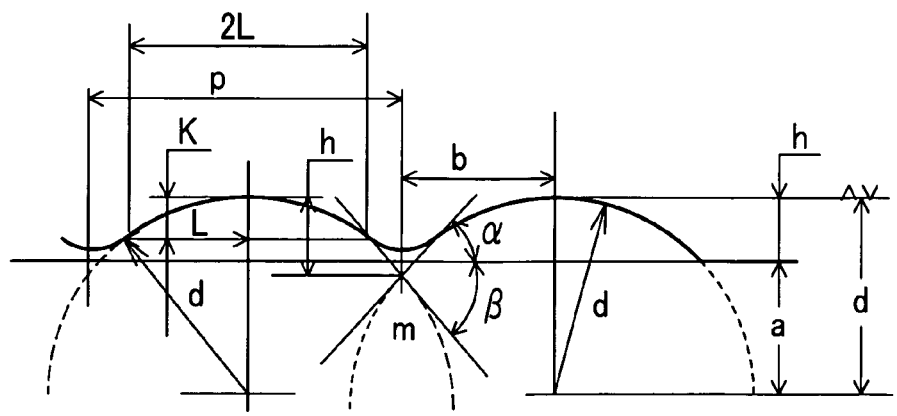

Further, although the arcuate cross-sectional grooves are designed as shown in FIG. 25A, the actual grooves exhibit gentle arcuate connection portions due to the actual machining accuracy as shown in FIG. 25B and hence, their exists a case in which the proper contact angle Ea may be changed corresponding to the degree of the finish of the product.

Figure 17:
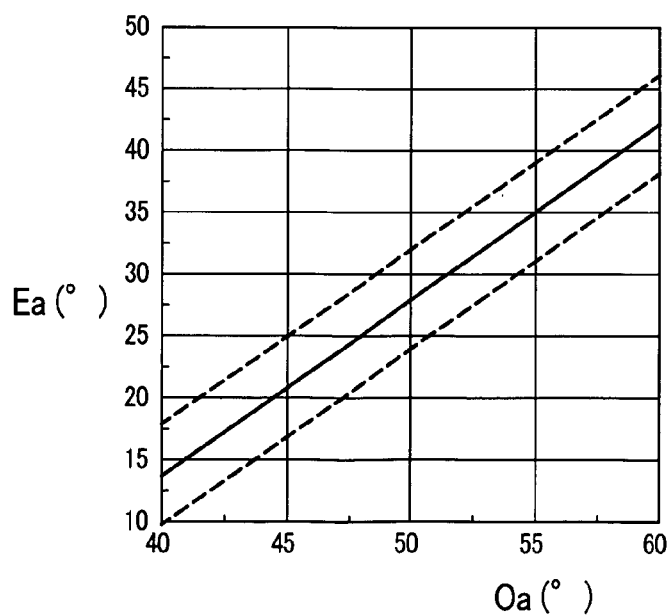
FIG. 17 is a view for explaining the relationship between the contact angle Oa and the contact angle Ea which allow the acquisition of balance between the brightness in front of the light emitting diode elements and the brightness between the light emitting diode elements when the arcuate cross-sectional grooves formed on the light guide plate are constituted of the lower-surface arcuate cross-sectional grooves.

Further, FIG. 17 is a view for explaining the relationship between the contact angle Oa and the contact angle Ea which allows the acquisition of balance between the brightness in front of the light emitting diode elements and the brightness between the light emitting diode elements when the arcuate cross-sectional grooves formed on the light guide plate are constituted of the lower-surface arcuate cross-sectional grooves. In the same manner as FIG. 16, a solid line in a graph indicates a center value of the proper contact angle Ea with respect to a certain contact angle Oa and the relationship can be expressed by a following formula (7).

$$Ea(°)=-46.5+1.5 \times Oa(°) \quad \text{formula (7)}$$

Further dotted lines above and below the center value indicate a proper range of the contact angle Ea, wherein the upper dotted line is expressed by a following formula (8), while the lower dotted line is expressed by a following formula (9).

$$Ea(°)=-46.5+1.5 \times Oa(°)+4(°) \quad \text{formula (8)}$$

$$Ea(°)=-46.5+1.5 \times Oa(°)-4(°) \quad \text{formula (9)}$$

Also in this embodiment, the proper range is determined by observing a range in which the brightness balance is acquired with naked eyes.

That is:

$$-46.5+1.5 \times Oa(°)-4(°) \leq Ea(°) \leq -46.5+1.5 \times Oa(°)+4(°) \quad \text{formula (10)}$$

To sum up, it is confirmed that by setting the contact angle Ea within a range expressed by a following formula (11), it is possible to obtain the display device which exhibits the brightness balance.

$$1.5 \times Oa - 50.5(°) \leq Ea(°) \leq 1.5 \times Oa - 42.5(°) \quad \text{formula (11)}$$

Here, it is also confirmed with naked eyes that even when the contact angles Ea and Oa are set such that the contact angles Ea and Oa fall within upper and lower tolerance ranges of ±8(°) with respect to the formula (7), the brightness balance can be acquired to some extent.

In this case, the relationship between the contact angle Oa of the upper-surface arcuate cross-sectional grooves and the contact angle Ea of the light-incident-surface arcuate cross-sectional grooves is expressed by a following formula (12).

$$1.5 \times Oa - 54.5(°) \leq Ea(°) \leq 1.5 \times Oa - 38.5(°) \quad \text{formula (12)}$$

Here, the reason why, compared to the case in which the arcuate cross-sectional grooves which are orthogonal to the light incident surface are formed on the upper surface of the light guide plate, when the arcuate cross-sectional grooves are formed on the lower surface of the light guide plate, the value of the proper contact angle Ea with respect to the same contact angle Oa becomes small is described below. When the arcuate cross-sectional grooves which are orthogonal to the light incident surface are formed on the upper surface of the light guide plate, the light is irradiated penetrating the arcuate portions and the light is consumed in front of the light emitting diode elements LED. To the contrary, when the arcuate cross-sectional grooves are formed on the lower surface of the light guide plate, the light which penetrates the arcuate portions is reflected on the reflection sheet (RFS in FIG. 1) and is again made to return into the inside of the light guide plate again and hence, a larger quantity of light arrives between the light emitting diode elements LED. Accordingly, when the arcuate cross-sectional grooves are formed on the lower surface, it is possible to increase the brightness between the light emitting diode elements LED with the relatively small value of the contact angle Ea and hence, the value of Ea is made small, compared to the case in which the arcuate cross-sectional grooves are formed on the upper surface of the light guide plate.

Figure 18:
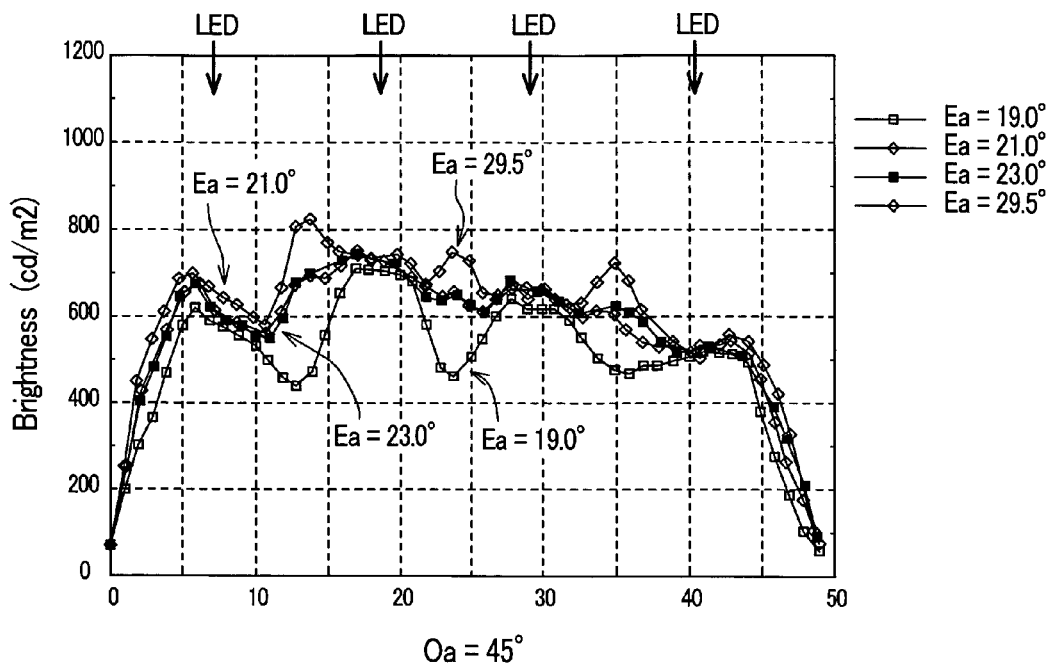
FIG. 18 is a view showing the brightness distribution in a graph when the graph shown in FIG. 15 is observed with actually measured values in a state that the arcuate cross-sectional grooves are formed in the lower surface of the light guide plate and the contact angle Oa is set as Oa=45°.

Further, FIG. 18 is a view showing the brightness distribution in a graph when the graph shown in FIG. 15 is observed with actually measured values in a state that the arcuate cross-sectional grooves are formed in the lower surface of the light guide plate and the contact angle Oa is set as Oa=45°. In FIG. 18, y-y° cross-sectional coordinates (mm) when the contact angle Oa is set as Oa=45° is taken on an axis of abscissas, and the brightness (cd/m²) are taken on an axis of ordinate. It is understood from FIG. 18 that it is possible to acquire the brightness balance when the contact angles Ea are set as Ea=21.0 and Ea=23.0 which fall within upper and lower tolerance ranges of 4(°) in the formula (1). To be more specific, FIG. 18 shows that the optimum brightness balance is acquired when the contact angle Ea falls within the upper and lower tolerance ranges of 2(°) in the formula (1).

Figure 19:
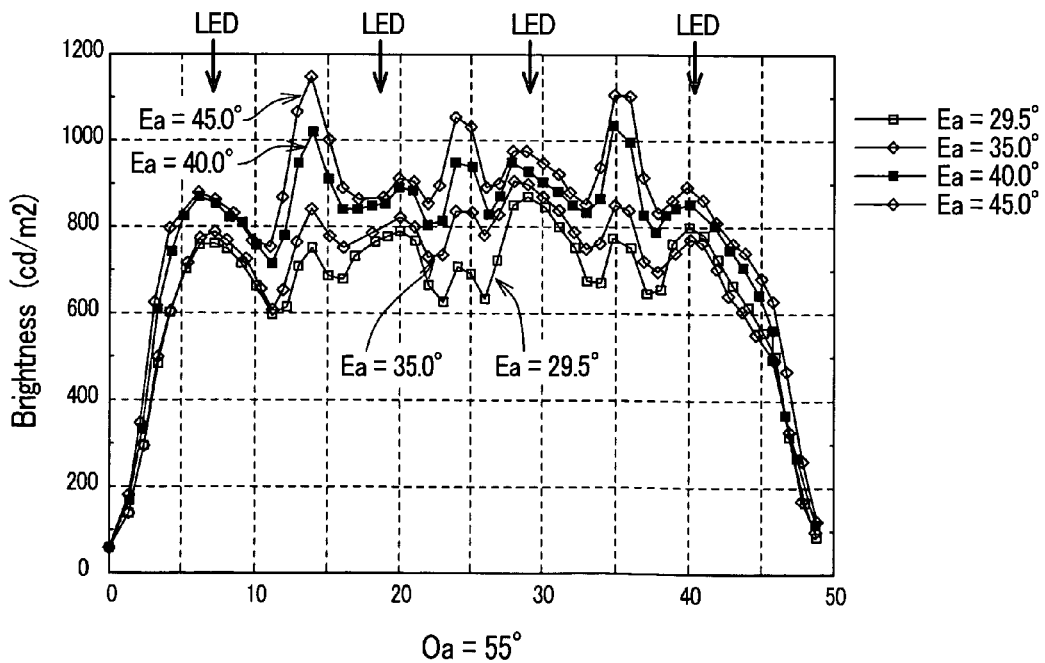
FIG. 19 is a view showing the brightness distribution in a graph when the graph shown in FIG. 15 is observed with actually measured values in a state that the arcuate cross-sectional grooves are formed in the lower surface of the light guide plate and the contact angle Oa is set as Oa=55°.

Next, FIG. 19 is a view showing the brightness distribution in a graph when the graph shown in FIG. 15 is observed with actually measured values in a state that the arcuate cross-sectional grooves are formed in the lower side of the light guide plate and the contact angle Oa is set as Oa=45°. Also it is understood from FIG. 19 that it is possible to acquire the brightness balance when the contact angles Ea are set as Ea=35.0 and Ea=40.0 which fall within upper and lower tolerance ranges of 4(°) in the formula (7). In FIG. 18 and FIG. 19, the y-y' cross-sectional coordinates (mm) are taken on an axis of ordinate and the brightness (cd/m²) is taken on an axis of abscissas.

To recapitulate steps for adjusting the brightness distribution using the arcuate cross-sectional grooves formed on the lower surface, the upper surface and the light incident surface of the light guide plate described heretofore, the steps become as follows.

(Step 1)

The contact angle Oa of the arcuate-shaped grooves formed on the upper surface of the light guide plate (upper-surface arcuate cross-sectional groove) is set to a certain value which falls within a range of 40° to 70°. Although it is unnecessary to particularly limit the range of the contact angle Oa, when the contact angle Oa is less than 40°, an effect to bring the light which spreads from the light emitting diode shown in FIG. 10 into the direction orthogonal to an eye of the prism becomes insufficient. On the other hand, when the contact angle Oa exceeds 70°, the reflection of light on the grooves shown in FIG. 13B becomes excessively large and hence, even when the contact angle Ea of the arcuate-shaped grooves formed in the light incident surface is set such that the maximum value assumes 90°, a quantity of light which arrives between the light emitting diodes becomes short. Accordingly, it is considered that such a range is proper as an actually applicable range.

(Step 2)

Figure 20:
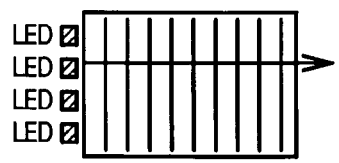
FIG. 20 is a view showing a height of grooves (relative value) with respect to a distance (relative value) from the light incident surface of the light guide plate.
Figure 20:
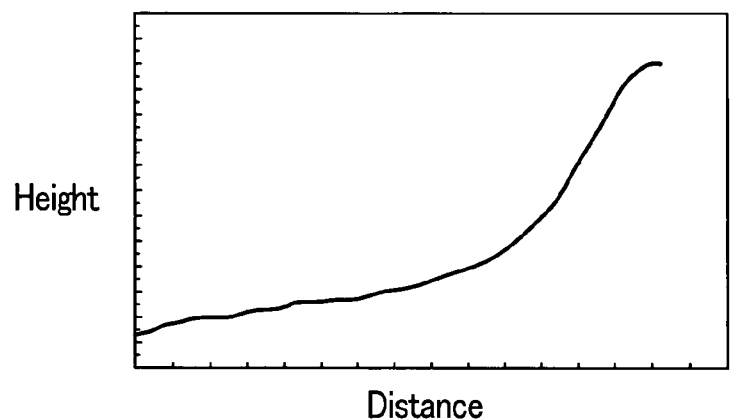

FIG. 20 describes the grooves formed on a lower side of the light guide plate and describes a phenomenon that the remoter from the light emitting diode element LED, a height of the grooves is increased correspondingly.

In this manner, as shown in FIG. 20, the distribution of the relative value of the height of the grooves shown in the line of ordinate (Rd in FIG. 5) is adjusted so as to determine the brightness distribution of the whole backlight. The relative value of the distance from the light incident surface is taken on an axis of abscissas in FIG. 20. However, in place of the height distribution of the grooves (Rd in FIG. 5), the adjustment may be performed using a pitch of the grooves (Rp in FIG. 5). Here, FIG. 20 shows the height of grooves (relative value) with respect to the distance (relative value) from the light incident surface of the light guide plate. The measured positions are indicated at an upper portion of FIG. 20.

(Step 3)

Based on the formula (1), the contact angle Ea of the light incident grooves which can minimize the brightness irregularities is determined.

Here, when the grooves formed on the upper-surface of the light guide plate (upper-surface arcuate cross-sectional grooves) and the grooves formed on the lower-surface of the light guide plate (upper-surface arcuate cross-sectional grooves) are exchanged between the upper and lower surfaces, the characteristic is slightly changed. Advantages and disadvantages brought about by such an exchange are summed up in Table 1.

TABLE 1

| Item | Arcuate cross-sectional grooves formed on an upper surface | Arcuate cross-sectional grooves formed on lower surface |
|---|---|---|
| Brightness | 5% decrease compared to case that grooves are formed in lower surface | — |

TABLE 1-continued

| Item | Arcuate cross-sectional grooves formed on an upper surface | Arcuate cross-sectional grooves formed on lower surface |
|---|---|---|
| Adhesion irregularities between reflection sheet and light guide plate | No irregularities | Irregularities observed (however no irregularities in case of white reflection sheet) |

In Table 1, although the case in which the arcuate cross-sectional grooves which are orthogonal to the light incident surface are formed on the lower surface of the light guide plate exhibits the brightness approximately 5% higher than the corresponding brightness of the case in which the arcuate cross-sectional grooves are formed on the upper surface of the light guide plate, the contact area of the light guide plate with the reflection sheet is large thus giving rise to the brightness irregularities attributed to the close adhesion.

However, the brightness irregularities are generated when the reflection sheet having a mirror surface formed by silver vapor deposition or the like and hence, when the reflection sheet is a white sheet, the close adhesion is alleviated and no brightness irregularities are generated.

As the preferable specification, the arcuate-shaped grooves orthogonal to the light incident surface of the light guide plate are formed of the upper-surface arcuate cross-sectional grooves formed on the upper surface of the light guide plate and the contact angle Oa is set to approximately 50°. The triangular-shaped grooves parallel to the light incident surface of the light guide plate are formed on the lower surface of the light guide plate thus constituting the lower-surface triangular cross-sectional grooves, wherein a pitch of the triangular cross-sectional grooves is fixed to 0.143 and the height distribution is adjusted. It is also possible to set the contact angle Ea of the light-incident-surface arcuate cross-sectional grooves formed on the light incident surface of the light guide plate to a value in the vicinity of Ea=44°.

EMBODIMENT 2

Figure 21:
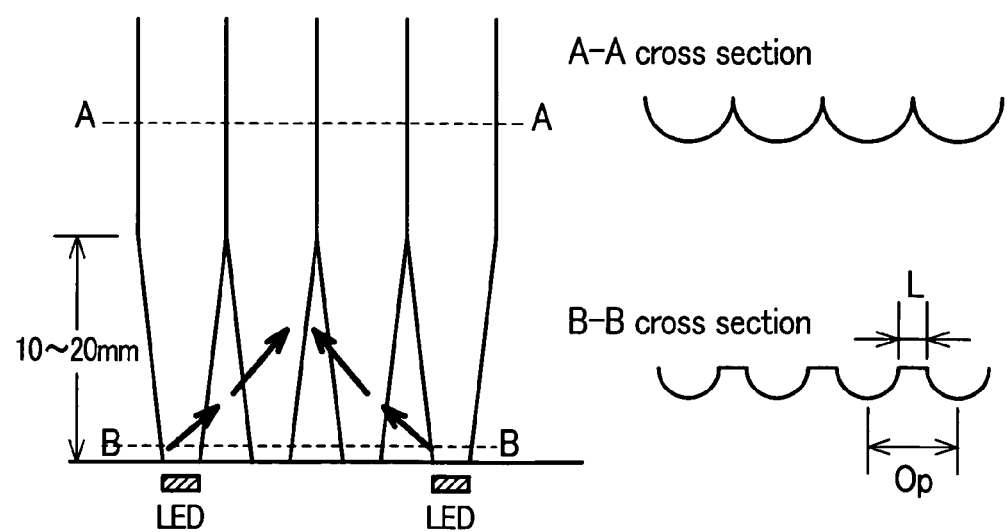
FIG. 21 is an explanatory view of an embodiment 2, wherein the arcuate cross-sectional grooves (lower-surface arcuate cross-sectional grooves) are formed in the lower surface of the light guide plate and a flat portion is formed between these grooves.

FIG. 21 is an explanatory view of an embodiment 2, wherein the arcuate cross-sectional grooves (lower-surface arcuate cross-sectional grooves) are formed in the lower surface of the light guide plate and a flat portion is formed between these grooves. Besides the contact angle Oa of the lower-surface arcuate cross-sectional grooves formed on the light guide plate, there exist parameters which adjust the balance between the brightness in front of the light emitting diode elements LED and the brightness between the light emitting diode elements LED. One of such parameters is a flat portion between the grooves shown in FIG. 21. Although the lower-surface arcuate shapes formed on the light guide plate (the lower-surface arcuate cross-sectional grooves) are usually formed contiguously, by providing the flat portion between the grooves, a quantity of light between the light emitting diode elements LED is increased thus increasing the brightness on the surface of the light guide plate between the light emitting diode elements LED. However, when the flat portion becomes excessively large, an adverse effect is brought about to the contrary. Accordingly, for example, when a distance between the arcuate portions is set as Op and a length of the flat portion is set as L, it is preferable to perform the adjustment such that L/Op×100 falls within a range of 5 to 25%.

Figure 22:
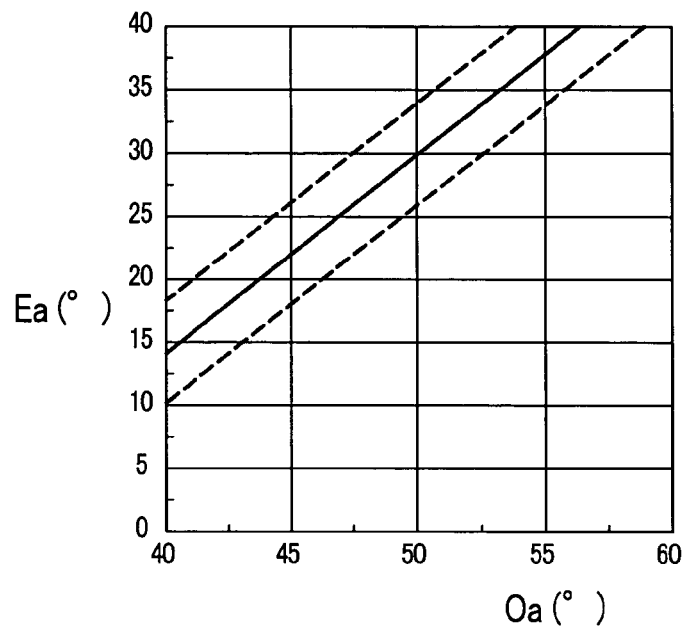
FIG. 22 is a view showing the relationship between the arcuate contact angle Oa on the upper surface of the light guide plate and the contact angle Ea of the grooves on the light incident surface when the arcuate cross-sectional grooves orthogonal to the light incident surface of the light guide plate is formed in the upper surface of the light guide plate and flat portions are formed in the grooves formed in the lower surface of the light guide plate (between the lower-surface triangular cross sectional grooves) at a rate of approximately 15%.

FIG. 22 is a view showing the relationship between the arcuate contact angle Oa on the upper surface of the light guide plate and the contact angle Ea of the grooves on the light incident surface when the arcuate cross-sectional grooves orthogonal to the light incident surface of the light guide plate is formed in the upper surface of the light guide plate and flat portions are formed in the grooves formed in the lower surface of the light guide plate (between the lower-surface triangular cross-sectional grooves) at a rate of approximately 15% in a graph.

Figure 23:
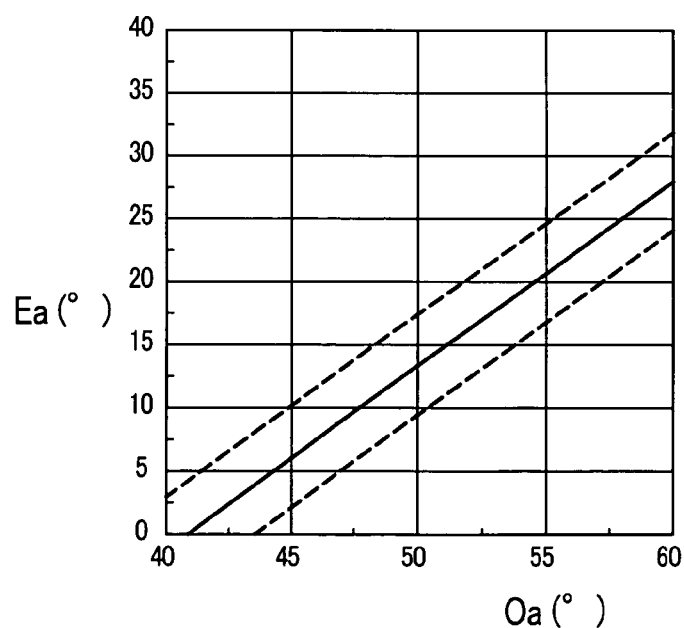
FIG. 23 is a view showing the relationship between the arcuate contact angle Oa on the lower surface of the light guide plate and the contact angle Ea of the grooves on the light incident surface when the arcuate cross-sectional grooves orthogonal to the light incident surface of the light guide plate is formed in the lower surface of the light guide plate and flat portions are formed in the grooves formed in the upper surface of the light guide plate (between the upper-surface triangular cross sectional grooves) at a rate of approximately 15%.

Further, FIG. 23 is a view showing the relationship between the arcuate contact angle Oa on the lower surface of the light guide plate and the contact angle Ea of the grooves on the light incident surface when the arcuate cross-sectional grooves orthogonal to the light incident surface of the light guide plate is formed in the lower surface of the light guide plate and flat portions are formed in the grooves formed in the upper surface of the light guide plate (between the upper-surface triangular cross-sectional grooves) at a rate of approximately 15% in a graph.

In FIG. 22 and FIG. 23, although the contact angle Ea is large, the brightness lines appear in the direction that the light spreads from light emitting diode elements LED, the contact angle Ea can be made small using this method and hence, the brightness lines can be alleviated.

Here, the proper relationship between the contact angle Oa and the contact angle Ea when the arcuate cross-sectional grooves orthogonal to the light incident surface of the light guide plate are formed on the upper surface of the light guide plate can be set as follows. That is, a center line indicates the relationship which is expressed by a following formula (13).

$$Ea(°)=-46.0+1.5\times Oa(°) \quad \text{formula (13)}$$

An upper dotted line indicates the relationship which is expressed by a following formula (14).

$$Ea(°)=-46.0+1.5\times Oa(°)+4(°) \quad \text{formula (14)}$$

Further, a lower dotted line indicates the relationship which is expressed by a following formula (15).

$$Ea(°)=-46.0+1.5\times Oa(°)-4(°) \quad \text{formula (15)}$$

Also in this embodiment, such a proper range is determined by observing a range where the brightness balance is acquired with naked eyes.

That is:

$$-46.0+1.5\times Oa(°)-4(°) \leq Ea(°) \leq -46.0+1.5\times Oa(°)+4(°) \quad \text{formula (16)}$$

To sum up, it is confirmed that, by setting the relationship within a range expressed by a following formula (17), it is possible to obtain the display device which acquires the brightness balance.

$$1.5\times Oa(°)-50.5(°) \leq Ea(°) \leq 1.5\times Oa(°)-42.0(°) \quad \text{formula (17)}$$

Here, it is also confirmed with naked eyes that even when the contact angles Ea and Oa are set such that the contact angles Ea and Oa fall within upper and lower tolerance ranges of ±8(°) with respect to the formula (13), the brightness balance can be acquired to some extent.

In this case, the relationship between the contact angle Oa of the upper-surface arcuate cross-sectional grooves and the contact angle Ea of the light-incident-surface arcuate cross-sectional grooves is expressed by a following formula (18).

$$1.5\times Oa-54.0(°) \leq Ea(°) \leq 1.5\times Oa-38.0(°) \quad \text{formula (18)}$$

Further, the proper relationship between the contact angle Oa and the contact angle Ea when the arcuate cross-sectional grooves orthogonal to the light incident surface of the light guide plate are formed on the lower surface of the light guide plate can be set as follows. That is, a center line indicates the relationship which is expressed by a following formula (19).

That is, a center line indicates the relationship which is expressed by a following formula (19).

$$Ea(°)=-61.5+1.5\times Oa(°) \quad \text{formula (19)}$$

An upper dotted line indicates the relationship which is expressed by a following formula (20).

$$Ea(°)=-61.5+1.5\times Oa(°)+4(°) \quad \text{formula (20)}$$

Further, a lower dotted line indicates the relationship which is expressed by a following formula (21).

$$Ea(°)=-61.5+1.5\times Oa(°)-4(°) \quad \text{formula (21)}$$

Also in this embodiment, such a proper range is determined by observing a range where the brightness balance is acquired with naked eyes.

That is:

$$-61.5+1.5\times Oa(°)-4(°) \leq Ea(°) \leq -61.5+1.5\times Oa(°)+4(°) \quad \text{formula (22)}$$

To sum up, it is confirmed that, by setting the relationship within a range expressed by a following formula (23), it is possible to obtain the display device which acquires the brightness balance.

$$1.5\times Oa(°)-65.5(°) \leq Ea(°) \leq 1.5\times Oa(°)-57.5(°) \quad \text{formula (23)}$$

Here, it is also confirmed with naked eyes that even when the contact angles Ea and Oa are set such that the contact angles Ea and Oa fall within upper and lower tolerance ranges of ±8 (°) with respect to the formula (18), the brightness balance can be acquired to some extent.

In this case, the relationship between the contact angle Oa of the upper-surface arcuate cross-sectional grooves and the contact angle Ea of the light-incident-surface arcuate cross-sectional grooves is expressed by a following formula (24).

$$1.5\times Oa(°)-69.5(°) \leq Ea(°) \leq 1.5\times Oa(°)-53.5(°) \quad \text{formula (24)}$$

EMBODIMENT 3

The present invention is also advantageous in the countermeasures to cope with the brightness irregularities also in the conventional backlight which provides two upward prisms orthogonal to each other between the light guide plate and the liquid crystal display panel. As advantages, followings are named.

(1) Although the front-surface brightness is approximately 60 to 70% of the front-surface brightness of the downward prism system, the viewing angle characteristic is wide (the viewing angle characteristic in the direction orthogonal to the prism formed of the downward prism is ±10° at a half value width, while the viewing angle characteristic of two upward prisms is ±20° at a half value width).

(2) Further, compared with the related art, the brightness irregularities can be reduced and hence, it is possible to eliminate the diffusion sheet whereby a cost can be reduced by an amount corresponding to the elimination of the diffusion sheet. Further the front surface brightness can be also enhanced by approximately 5 to 10% compared to the related art.

The constitution is substantially equal to the above-mentioned downward prism. That is:

(1) The grooves having the arcuate (semi-circular) cross section are formed in the light incident surface (contact angle Ea).

(2) The grooves having the arcuate (semi-circular) cross section in the direction which is orthogonal to the light incident surface are formed on the upper surface of the light guide plate (contact angle Oa). In case of the downward prism, the grooves may be formed on either one of the lower surface and the upper surface of the light guide plate. However, with respect to the upward prism, it is empirically found that the formation of the grooves on the upper surface of the light guide plate exhibits the higher front-surface brightness compared to the front-surface brightness obtained in the case in which the grooves are formed on the lower surface of the light guide plate.

Figure 24:
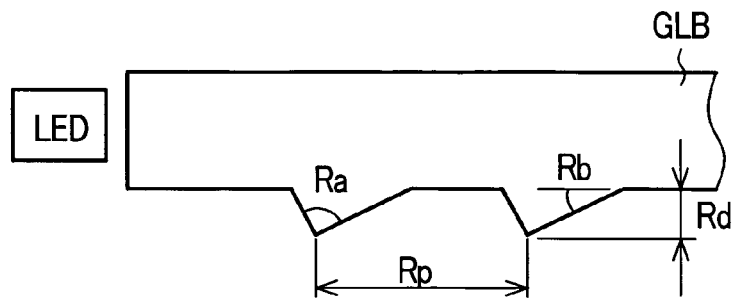
FIG. 24 is a partial cross-sectional view of grooves in the direction parallel to the light incident surface which are formed on a lower surface of the light guide plate.

(3) The grooves are formed on the lower surface of the light guide plate in the direction parallel to the light incident surface. The cross section of the grooves may be a triangular shape as in the case of FIG. 24, wherein the inclination angle Rb of the grooves is set to a value which falls within a range of 20 to 30°.

EMBODIMENT 4

Due to the methods described above, it is possible to uniformly adjust the brightness in front of the light emitting diode elements LED and the brightness between the light emitting diode elements LED. However, the backlight is designed such that a distance A2 from the outer light emitting diode elements LED to the corner portion is set larger than a half-value A1 of the distance between the light emitting diode elements LED shown in FIG. 26, there arises a drawback that the corner portion becomes dark.

Figure 26:
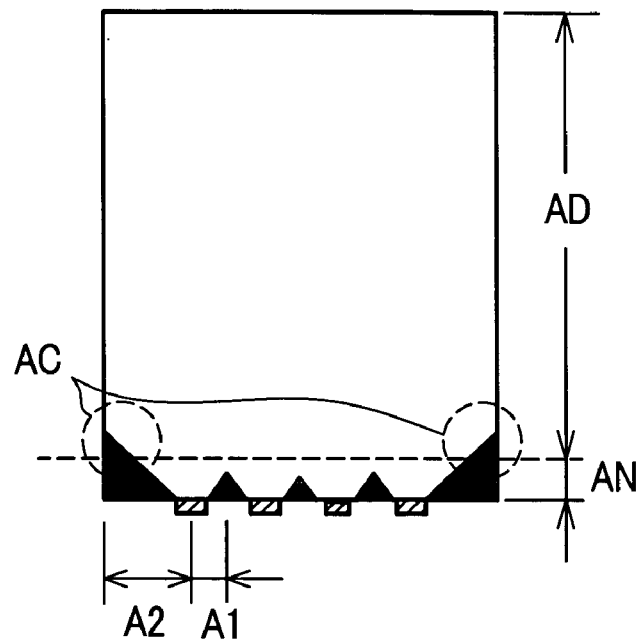
FIG. 26 is a view showing the constitution in which four spot light sources such as LEDs or the like are arranged along the light incident surface.

FIG. 26 shows a non-display region AN which is arranged in the vicinity of a portion where the light source such as the light emitting diode elements LED or the like is arranged, the display region AD and the constitution in which four spot light sources such as the light emitting diode elements LED are arranged along the light incident surface. Although these four light emitting diode elements LED are respectively arranged at an equal interval, the drawing shows the case in which the value A1 which is ½ of the distance between the light emitting diode elements LED is set smaller than the distance A2 from the outermost light emitting diode elements LED to the corner portion. When such an arrangement is adopted, there arises a drawback that the dark region of the corner portion AC is increased.

Figure 27:
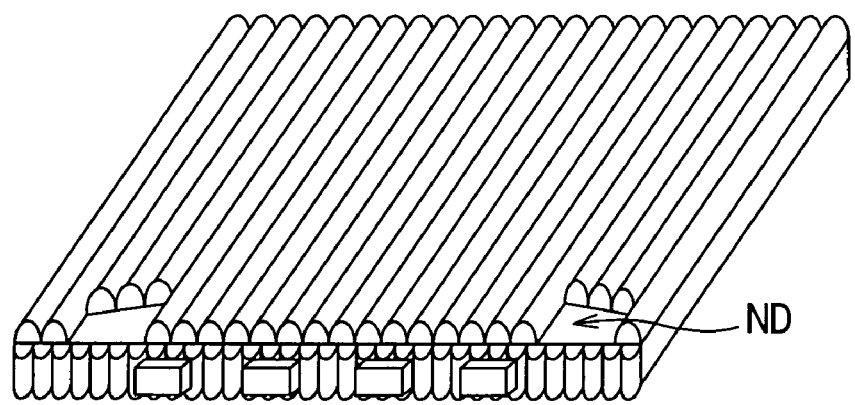
FIG. 27 is a view showing the constitution in which a flat portion is formed by eliminating a portion of grooves formed in the upper surface of the light guide plate between the outermost LED and a corner portion.

To cope with such a drawback, the improvement brought about by the adjustment of the contact angle Ea of the arcuate cross-sectional grooves on the light incident surface and the contact angle Oa of the arcuate cross-sectional groove on the upper surface of the light guide plate shown in FIG. 16 becomes insufficient. Accordingly, in the embodiment 4, as shown in FIG. 27, a portion of the grooves formed on the upper surface of the light guide plate between the outermost light emitting diode element LED and the corner portion AC is eliminated thus forming a flat portion ND. Due to such a constitution, it is possible to enhance the brightness of the corner dark region. The reason is explained hereinafter in conjunction with FIG. 28A and FIG. 28B.

Figure 28A:
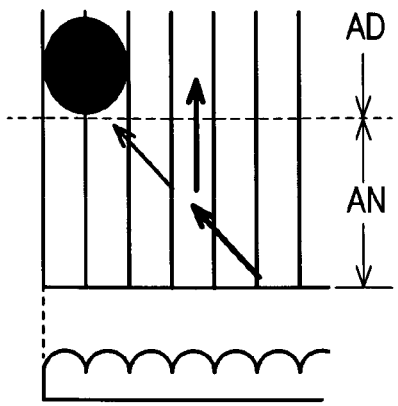
FIG. 28 is a view for explaining an arrival state of the light depending on the shape of the arcuate cross-sectional grooves formed in the light irradiation surface of the light guide plate.

FIG. 28A shows the constitution in which the arcuate cross-sectional grooves are formed on the light irradiation surface of the light guide plate in a state that the arcuate cross-sectional grooves are extended to the light-incident-surface side. In such a constitution, the light irradiated from the light emitting diode element LED does not sufficiently reach the corner since the grooves having the arcuate cross-section form barriers.

Figure 28B:
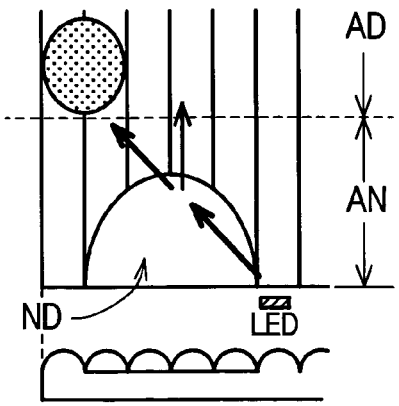

On the other hand, FIG. 28B shows the constitution of the embodiment 4, wherein in a region between the position where the light emitting diode element LED is arranged and the corner portion, a flat portion having no arcuate cross-sectional grooves is formed. By forming the flat portion as shown in FIG. 28B, the light irradiated from the light emitting diode element LED is allowed to sufficiently reach the corner portion without being blocked by barriers constituted of the arcuate cross-sectional grooves.

Figure 29:
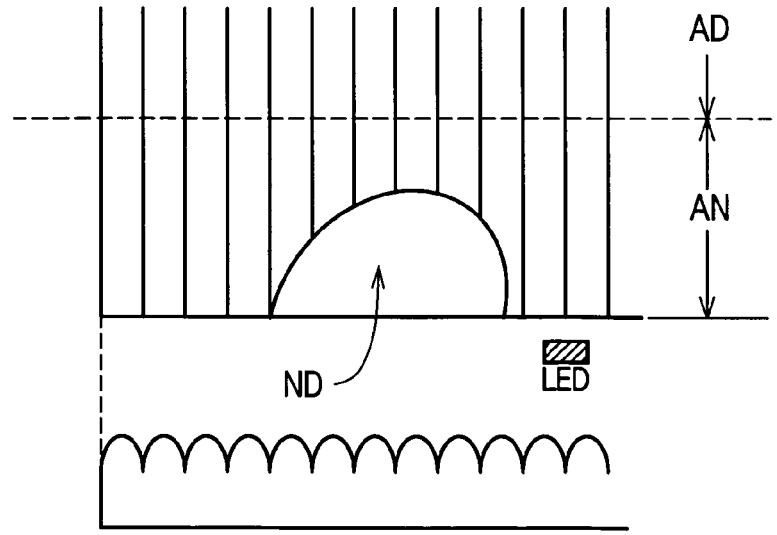
FIG. 29 is a view for explaining the constitution of an embodiment 4 in detail.

FIG. 29 shows the constitution of the embodiment 4 in detail, when the region having no arcuate cross-sectional grooves is arranged excessively close to the display region or the region having no grooves is excessively large, there exists a possibility that a shade of the region extends to the display region. Accordingly, it is preferable to provide the tolerance of 3 to 4 mm between the display region and the region having no grooves and to allow the region to have an area of necessary minimum.

EMBODIMENT 5

Next, another embodiment of the grooves formed on the light incident surface is explained. With respect to the grooves formed on the incident light surface, besides the arcuate cross-sectional grooves shown in FIG. 16 and FIG. 17, it is possible to form the grooves using means which form the light incident surface into a rough surface such as rasp (abrasion) machining shown in FIG. 30A and electro-discharge machining shown in FIG. 30B.

Figure 30A:
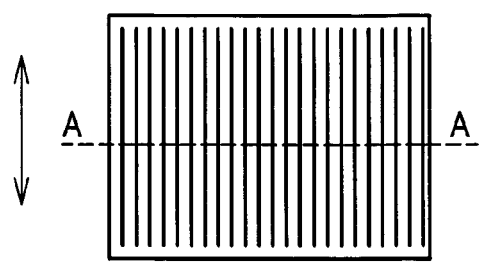
FIG. 30 is a view for explaining another example with respect to the grooves formed in the light incident surface.

FIG. 30A shows the case in which the stripe-like rough surface is formed in the wall thickness direction of the light incident surface of the light guide plate by the rasp (abrasion) machining or the like. It is preferable to set a state of the rough surface by machining such that the arithmetic average roughness Ra of a cross section taken along a line A-A in FIG. 30A becomes approximately 0.2-1.0 μm.

Figure 30B:
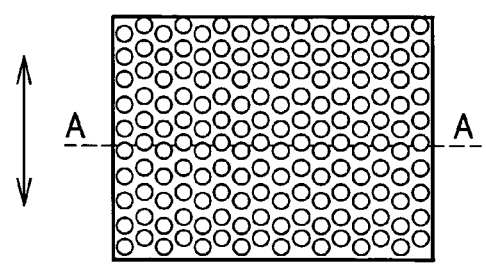

Further, FIG. 30B shows the case in which the crater-like rough surface is formed on the light incident surface of the light guide plate by electro-discharge machining. When such a constitution is adopted, it is preferable to perform the machining such that the arithmetic average roughness Ra taken along a line A-A in FIG. 30B becomes approximately 1.0 to 4.0 μm. In FIG. 30, an arrow indicates the plate thickness direction of the light guide plate.

Here, although the explanation has been made with respect to the case in which arcuate cross-sectional grooves are formed on the upper surface of the light guide plate, the constitution in which the arcuate cross-sectional grooves are formed on the lower surface of the light guide plate and the triangular grooves are formed on the upper surface of the light guide plate can also obtain the substantially equal advantageous effects.

[The Definition of Arithmetic Average Roughness]

Figure 31:
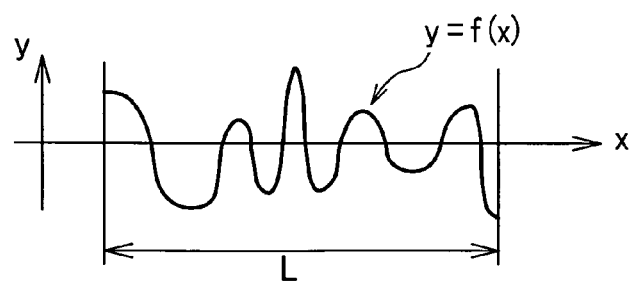
FIG. 31 is a view for explaining an arithmetic average roughness.

The arithmetic average roughness RA is defined by a following formula (5), wherein as shown in FIG. 31, only reference length L is sampled in the direction of an average line from a roughness curve y=f (x), an x axis is taken along the direction of the sampled portion, and the roughness curve is expressed by y=f(x).

$$Ra = 1/L \int_0^L |f(x)| dx \quad (5)$$

[Definition of Arcuate Contact Angle α]

FIG. 25A and FIG. 25B are views for explaining the definition of the arcuate contact angle of the minute arcuate cross-sectional shape on the surface of the light guide plate. In FIG. 25, at a point where two arcs are brought into contact with each other, angles which the tangents of respective arcs make with a horizontal line are defined as the arcuate contact angle α. As described in FIG. 25A, the definition formula of the contact angle α of the required arc is that the contact angle α is α=90−tan$^{-1}$(a/b).

In FIG. 25A, symbol d indicates a radius of the arc, symbol p indicates a distance between the arcs, symbol h indicates a height of the arc, symbol α indicates the contact angle, wherein relationships α=90−tan$^{-1}$(a/b), a=d−h, b=p/2 are established.

Further, in FIG. 25B, the relationship L=2L/2 is established, and the radius of arc d is calculated as d=(K×K+L×L)/2K using a triangular formula.

[Definition of Measuring Method of Contact Angle α in Arcuate Groove Shape of Light Guide Plate]

The light guide plate formed using a plastic resin can not be formed into the same shape by transfer molding even when a projection forming mold has arcs having the above-mentioned shape and hence, the contact angle is defined by a following measuring method. As an equipment which is used in the shape measurement, a contact type or non-contact type shape measuring device which is capable of measuring a minute shape is used. The arcuate radius d of the surface of the light guide plate is measured using the following measurement based on the shape data measured by a surface shape measuring device.

Since an intersecting point of the arcs formed on the surface of the light guide plate formed by resin molding does not make an acute angle, the intersecting point m is determined by drawing imaginary lines which are obtained by extending while maintaining the curvatures of the arcs. The intersecting point m of the arcuate imaginary extending lines and a horizontal line which assumes a 60% position of a height h to a crest portion of the arc, that is, a position at which K becomes K=0.6h from the crest portion of the arc is assumed, and a horizontal distance which connects intersecting points of the horizontal line and the arcuate shape on the surface of the light guide plate is set as 2L. Based on a triangle formed by the above-mentioned horizontal distance 2L and the radius of arc d, a following relationship is established.

$$d=(K^2+L^2)/2K$$

What is claimed is:

1. A liquid crystal display device comprising:
   a liquid crystal panel; and
   an illumination device which is arranged on a back surface of said liquid crystal panel;
   wherein said illumination device includes a light guide plate and a plurality of spot light sources on at least one side surface of said light guide plate;
   wherein said light guide plate includes a large number of upper-surface arcuate cross-sectional grooves in the direction orthogonal to said one side surface on an upper surface thereof which faces said liquid crystal panel;
   wherein a large number of light-incident-surface arcuate cross-sectional grooves are formed in the thickness direction of said light guide plate on at least a portion of said one side surface which faces a position at which said plurality of spot light sources are arranged; and wherein a relationship between a contact angle Oa of the upper-surface arcuate cross-sectional grooves and a contact angle Ea of the light-incident-surface arcuate cross-sectional grooves is set as $$1.5 \times Oa - 35(°) \leqq Ea(°) \leqq 1.5 \times Oa - 27(°).$$

2. A liquid crystal display device according to claim 1, wherein a flat portion is formed on said one side surface of said light guide plate at a position thereof which faces a position between two of said plurality of spot light sources.

3. A liquid crystal display device according to claim 1, wherein when a distance which is ½ of a distance between two of said plurality of spot light sources is smaller than a distance between one of said plurality of spot light sources which is arranged at an outermost side and a corner portion of said light guide plate, on said upper surface of said light guide plate, a flat portion is formed on said upper surface of said light guide plate in the vicinity of a region which extends from said one of said plurality of spot light sources which is arranged at said outermost side to said corner portion.

4. A liquid crystal display device according to claim 2, wherein when a distance which is ½ between two of said plurality of spot light sources is smaller than a distance between one said plurality of spot light sources which is arranged at an outermost side and a corner portion of said light guide plate, on said upper surface of the light guide plate, a flat portion is formed in the vicinity of a region which extends from said one of said plurality of spot light sources which is arranged at said outermost side to said corner portion.

5. A liquid crystal display device according to claim 1, wherein between said liquid crystal panel and said illumination device, a prism sheet on which a large number of prism grooves are formed in parallel in the direction orthogonal to the direction that said upper-surface arcuate cross-sectional grooves of said light guide plate are formed on said light guide plate side.

6. A liquid crystal display device according to claim 1, wherein on a surface of said light guide plate opposite to a surface on which the upper-surface arcuate cross-sectional grooves are formed, a large number of lower-surface triangular cross-sectional grooves are formed in the direction orthogonal to the direction that said upper-surface arcuate cross-sectional grooves of said light guide plate are formed.

7. A liquid crystal display device according to claim 6, wherein a reflection film or a reflection sheet is arranged on a lower side of the lower-surface triangular cross-sectional grooves of said light guide plate.

8. A liquid crystal display device according to claim 1, wherein the relationship between the contact angle Oa and the contact angle Ea enable said light guide plate to have excellent brightness distribution without brightness irregularities in a vicinity of said one side surface of said light guide plate which faces the position at which said plurality of spot light sources are arranged.

9. A liquid crystal display device comprising:
a liquid crystal panel; and
an illumination device which is arranged on a back surface of a liquid crystal panel;
wherein said illumination device includes a light guide plate and a plurality of spot light source on at least one side surface of said light guide plate;
wherein said light guide plate includes a large number of upper-surface arcuate cross-sectional grooves in the direction orthogonal to said one side surface on an upper surface thereof which faces said liquid crystal panel;
wherein a large number of light-incident-surface arcuate cross-sectional grooves are formed in the thickness direction of said light guide plate on at least a portion of said one side surface which faces a position at which said plurality of spot light sources are arranged; and
wherein a relationship between a contact angle Oa of the upper-surface arcuate cross-sectional grooves and a contact angle Ea of the light-incident-surface arcuate cross-sectional grooves is set as $$1.5 \times Oa - 39(°) \leqq Ea(°) \leqq 1.5 \times Oa - 23(°).$$

10. A liquid crystal display device according to claim 9, wherein a flat portion is formed on said one side surface of said light guide plate at a position thereof which faces a position between two of said plurality of spot light sources.

11. A liquid crystal display device according to claim 9, wherein when a distance which is ½ of a distance between two of said plurality of spot light sources is smaller than a distance between one of said plurality of spot light sources which is arranged at an outermost side and a corner portion of said light guide plate, on said upper surface of said light guide plate, a flat portion is formed in the vicinity of a region which extends from said one of said plurality of spot light sources which is arranged at said outermost side to said corner portion.

12. A liquid crystal display device according to claim 10, wherein when a distance which is ½ between two of said plurality of spot light sources is smaller than a distance between one said plurality of spot light sources which is arranged at an outermost side and a corner portion of said light guide plate, on said upper surface of said light guide plate, a flat portion is formed in the vicinity of a region which extends from said one of said plurality of said spot light sources which is arranged at said outermost side to said corner portion.

13. A liquid crystal display device according to claim 9, wherein between said liquid crystal panel and said illumination device, a prism sheet on which a large number of prism grooves are formed in parallel in the direction orthogonal to the direction that the upper-surface arcuate cross-sectional grooves of said light guide plate are formed on said light guide plate side.

14. A liquid crystal display device according to claim 9, wherein on a surface of said light guide plate opposite to a surface on which the upper-surface arcuate cross-sectional grooves are formed, a large number of lower-surface triangular cross-sectional grooves are formed in the direction orthogonal to the direction that the upper-surface arcuate cross-sectional grooves of said light guide plate are formed.

15. A liquid crystal display device according to claim 9, wherein a reflection film or a reflection sheet is arranged on a lower side of the lower-surface triangular cross-sectional grooves of said light guide plate.

16. A liquid crystal display device according to claim 9, wherein the relationship between the contact angle Oa and the contact angle Ea enable said light guide plate to have excellent brightness distribution without brightness irregularities in a vicinity of said one side surface of said light guide plate which faces the position at which said plurality of spot light sources are arranged.

* * * * *

UNITED STATES PATENT AND TRADEMARK OFFICE
CERTIFICATE OF CORRECTION

PATENT NO. : 7,663,713 B2 Page 1 of 1
APPLICATION NO. : 11/287294
DATED : February 16, 2010
INVENTOR(S) : Saito et al.

It is certified that error appears in the above-identified patent and that said Letters Patent is hereby corrected as shown below:

On the title page, item:
(73) Assignees should read: Hitachi Displays, Ltd., Chiba-ken (JP);
Hitachi Display Devices, Ltd., Chiba-ken (JP)

Signed and Sealed this

Twenty-seventh Day of July, 2010

David J. Kappos
*Director of the United States Patent and Trademark Office*